United States Patent
Arai et al.

(10) Patent No.: US 11,078,558 B2
(45) Date of Patent: Aug. 3, 2021

(54) STEEL MATERIAL, OIL-WELL STEEL PIPE, AND METHOD FOR PRODUCING STEEL MATERIAL

(71) Applicant: Nippon Steel Corporation, Tokyo (JP)

(72) Inventors: Yuji Arai, Tokyo (JP); Shinji Yoshida, Tokyo (JP); Atsushi Soma, Tokyo (JP); Hiroki Kamitani, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 122 days.

(21) Appl. No.: 16/339,577

(22) PCT Filed: Oct. 6, 2017

(86) PCT No.: PCT/JP2017/036459
§ 371 (c)(1),
(2) Date: Apr. 4, 2019

(87) PCT Pub. No.: WO2018/066689
PCT Pub. Date: Apr. 12, 2018

(65) Prior Publication Data
US 2020/0040436 A1 Feb. 6, 2020

(30) Foreign Application Priority Data
Oct. 6, 2016 (JP) .............................. JP2016-197809

(51) Int. Cl.
*C22C 38/42* (2006.01)
*C21D 7/13* (2006.01)
*C21D 9/08* (2006.01)
*C22C 38/00* (2006.01)
*C22C 38/02* (2006.01)
*C22C 38/04* (2006.01)
*C22C 38/06* (2006.01)
(Continued)

(52) U.S. Cl.
CPC ................ *C22C 38/42* (2013.01); *C21D 7/13* (2013.01); *C21D 9/085* (2013.01); *C22C 38/001* (2013.01);
(Continued)

(58) Field of Classification Search
CPC ... C21D 1/18; C21D 7/13; C21D 8/02; C21D 8/0205; C21D 8/0226; C21D 8/10;
(Continued)

(56) References Cited

U.S. PATENT DOCUMENTS

2006/0266448 A1* 11/2006 Arai .................... C22C 38/22
148/593
2011/0259482 A1* 10/2011 Peters .................... C21D 6/002
148/590
(Continued)

FOREIGN PATENT DOCUMENTS

| JP | S59-232220 A | 12/1984 |
|---|---|---|
| JP | S62-253720 A | 11/1987 |

(Continued)

OTHER PUBLICATIONS

English Abstract of JP-S62-253720A.
(Continued)

*Primary Examiner* — Nicholas A Wang
(74) *Attorney, Agent, or Firm* — Banner & Witcoff, Ltd.

(57) ABSTRACT

The steel material according to the present invention contains a chemical composition consisting of, in mass %, C: 0.25 to 0.50%, Si: 0.05 to 0.50%, Mn: 0.05 to 1.00%, P: 0.025% or less, S: 0.0100% or less, Al: 0.005 to 0.100%, Cr: 0.30 to 1.50%, Mo: 0.25 to 1.50%, Ti: 0.002 to 0.050%, B: 0.0001 to 0.0050%, N: 0.002 to 0.010% and O: 0.0100% or less, with the balance being Fe and impurities. The steel material also contains an amount of dissolved C within a range of 0.010 to 0.050 mass%. The steel material also contains an yield strength is in a range of 862 to less than 965 MPa, and an yield ratio is 90% or more.

19 Claims, 2 Drawing Sheets

(51) Int. Cl.
    *C22C 38/44*     (2006.01)
    *C22C 38/46*     (2006.01)
    *C22C 38/48*     (2006.01)
    *C22C 38/50*     (2006.01)
    *C22C 38/52*     (2006.01)
    *C22C 38/54*     (2006.01)
    *C21D 1/18*     (2006.01)

(52) U.S. Cl.
    CPC ............ *C22C 38/002* (2013.01); *C22C 38/02* (2013.01); *C22C 38/04* (2013.01); *C22C 38/06* (2013.01); *C22C 38/44* (2013.01); *C22C 38/46* (2013.01); *C22C 38/48* (2013.01); *C22C 38/50* (2013.01); *C22C 38/52* (2013.01); *C22C 38/54* (2013.01); *C21D 1/18* (2013.01)

(58) Field of Classification Search
    CPC .......... C21D 8/105; C21D 9/08; C21D 9/085; C21D 9/46
    See application file for complete search history.

(56) References Cited

U.S. PATENT DOCUMENTS

2011/0315276 A1* 12/2011 Bosch ..................... C22C 38/22
                                                                       148/334

2014/0352836 A1* 12/2014 Eguchi ................... C21D 8/105
                                                                         138/177

FOREIGN PATENT DOCUMENTS

| JP | H06-322478 A | 11/1994 |
| JP | H08-311551 A | 11/1996 |
| JP | 2000-256783 A | 9/2000 |
| JP | 2000256783 * | 9/2000 |
| JP | 2000-297344 A | 10/2000 |
| JP | 2005-350754 A | 12/2005 |
| JP | 2012-26030 A | 2/2012 |
| JP | 2012-519238 A | 8/2012 |
| WO | 2016093161 A1 | 6/2016 |

OTHER PUBLICATIONS

English Abstract of JP-S59-232220A.
English Abstract of JP-H06-322478A.
English Abstract of JP-H08-311551A.
English Abstract of JP-2012-519238A.
English Abstract of JP-2012-026030A.
English Abstract of JP-2005-350754A.
English Abstract of JP-2000-297344A.
English Abstract of JP-2000-256783A.

* cited by examiner

STEEL MATERIAL, OIL-WELL STEEL PIPE, AND METHOD FOR PRODUCING STEEL MATERIAL

TECHNICAL FIELD

The present invention relates to a steel material, an oil-well steel pipe, and a method for producing the steel material, and more particularly relates to a steel material and an oil-well steel pipe suitable for use in a sour environment, and a method for producing the steel material.

BACKGROUND ART

Due to the deepening of oil wells and gas wells (hereunder, oil wells and gas wells are collectively referred to as "oil wells"), there is a demand to enhance the strength of oil-well steel pipes. Specifically, 80 ksi-grade (yield strength is 80 to 95 ksi, that is, 551 to 655 MPa) and 95 ksi-grade (yield strength is 95 to 110 ksi, that is, 655 to 758 MPa) oil-well steel pipes are being widely utilized, and recently requests are also starting to be made for 110 ksi-grade (yield strength is 110 to 125 ksi, that is, 758 to 862 MPa) and 125 ksi-grade (yield strength is 125 to 140 ksi, that is, 862 to 965 MPa) oil-well steel pipes.

Most deep wells are in a sour environment containing corrosive hydrogen sulfide. Oil-well steel pipes for use in such sour environments are required to have not only high strength, but to also have sulfide stress cracking resistance (hereunder, referred to as "SSC resistance").

Technology for enhancing the SSC resistance of steel materials as typified by oil-well steel pipes is disclosed in Japanese Patent Application Publication No. 62-253720 (Patent Literature 1), Japanese Patent Application Publication No. 59-232220 (Patent Literature 2), Japanese Patent Application Publication No. 6-322478 (Patent Literature 3), Japanese Patent Application Publication No. 8-311551 (Patent Literature 4), Japanese Patent Application Publication No. 2000-256783 (Patent Literature 5), Japanese Patent Application Publication No. 2000-297344 (Patent Literature 6), Japanese Patent Application Publication No. 2005-350754 (Patent Literature 7), National Publication of International Patent Application No. 2012-519238 (Patent Literature 8) and Japanese Patent Application Publication No. 2012-26030 (Patent Literature 9).

Patent Literature 1 proposes a method for improving the SSC resistance of steel for oil wells by reducing impurities such as Mn and P. Patent Literature 2 proposes a method for improving the SSC resistance of steel by performing quenching twice to refine the grains.

Patent Literature 3 proposes a method for improving the SSC resistance of a 125 ksi-grade steel material by refining the steel microstructure by a heat treatment using induction heating. Patent Literature 4 proposes a method for improving the SSC resistance of steel pipes of 110 to 140 ksi grade by enhancing the hardenability of the steel by utilizing a direct quenching process and also increasing the tempering temperature.

Patent Literature 5 and Patent Literature 6 each propose a method for improving the SSC resistance of a steel for low-alloy oil country tubular goods of 110 to 140 ksi grade by controlling the shapes of carbides. Patent Literature 7 proposes a method for improving the SSC resistance of steel material of 125 ksi (862 MPa) grade or higher by controlling the dislocation density and the hydrogen diffusion coefficient to desired values. Patent Literature 8 proposes a method for improving the SSC resistance of steel of 125 ksi (862 MPa) grade by subjecting a low-alloy steel containing 0.3 to 0.5% of C to quenching multiple times. Patent Literature 9 proposes a method for controlling the shapes or number of carbides by employing a tempering process composed of a two-stage heat treatment. More specifically, in Patent Literature 9, a method is proposed that enhances the SSC resistance of 125 ksi (862 MPa) grade steel by suppressing the number density of large $M_3C$ particles or $M_2C$ particles.

CITATION LIST

Patent Literature

Patent Literature 1: Japanese Patent Application Publication No. 62-253720
Patent Literature 2: Japanese Patent Application Publication No. 59-232220
Patent Literature 3: Japanese Patent Application Publication No. 6-322478
Patent Literature 4: Japanese Patent Application Publication No. 8-311551
Patent Literature 5: Japanese Patent Application Publication No. 2000-256783
Patent Literature 6: Japanese Patent Application Publication No. 2000-297344
Patent Literature 7: Japanese Patent Application Publication No. 2005-350754
Patent Literature 8: National Publication of International Patent Application No. 2012-519238
Patent Literature 9: Japanese Patent Application Publication No. 2012-26030

However, even if the techniques disclosed in the aforementioned Patent Literatures 1 to 9 are applied, in the case of oil-well steel pipes having a yield strength of 125 ksi (YS is 862 MPa) or more, excellent SSC resistance cannot be stably obtained in some cases.

SUMMARY OF INVENTION

Technical Problem

An objective of the present invention is to provide a steel material and an oil-well steel pipe having a high yield strength in a range of 862 to less than 965 MPa (125 to less than 140 ksi) and excellent SSC resistance.

Solution to Problem

A steel material according to the present invention contains a chemical composition consisting of, in mass %, C: 0.25 to 0.50%, Si: 0.05 to 0.50%, Mn: 0.05 to 1.00%, P: 0.025% or less, S: 0.0100% or less, Al: 0.005 to 0.100%, Cr: 0.30 to 1.50%, Mo: 0.25 to 1.50%, Ti: 0.002 to 0.050%, B: 0.0001 to 0.0050%, N: 0.002 to 0.010%, O: 0.0100% or less, V: 0 to 0.30%, Nb: 0 to 0.100%, Ca: 0 to 0.0100%, Mg: 0 to 0.0100%, Zr: 0 to 0.0100%, Co: 0 to 0.50%, W: 0 to 0.50%, Ni: 0 to 0.50% and Cu: 0 to 0.50%, with the balance being Fe and impurities. The steel material according to the present invention contains an amount of dissolved C within a range of 0.010 to 0.050 mass %. A yield strength of the steel material is within a range of 862 to less than 965 MPa, and a yield ratio of the steel material is 90% or more.

A method for producing a steel material according to the present invention includes a preparation process, a quenching process and a tempering process. In the preparation process, an intermediate steel material containing the aforementioned chemical composition is prepared. In the quenching process, after the preparation process, the intermediate steel material that is at a temperature in a range of 800 to 1000° C. is cooled at a cooling rate of 300° C./min or more. In the tempering process, the intermediate steel material after the quenching is held for 10 to 180 minutes at a temperature in a range of 670° C. to an $A_{c1}$ point, and thereafter is cooled from 600 to 200° C. at an average cooling rate of 5 to 100° C./sec.

Advantageous Effects of Invention

The steel material and the oil-well steel pipe according to the present invention have a high yield strength in a range of 862 to less than 965 MPa (125 to less than 140 ksi) and have excellent SSC resistance.

DESCRIPTION OF EMBODIMENTS

Figure 1:
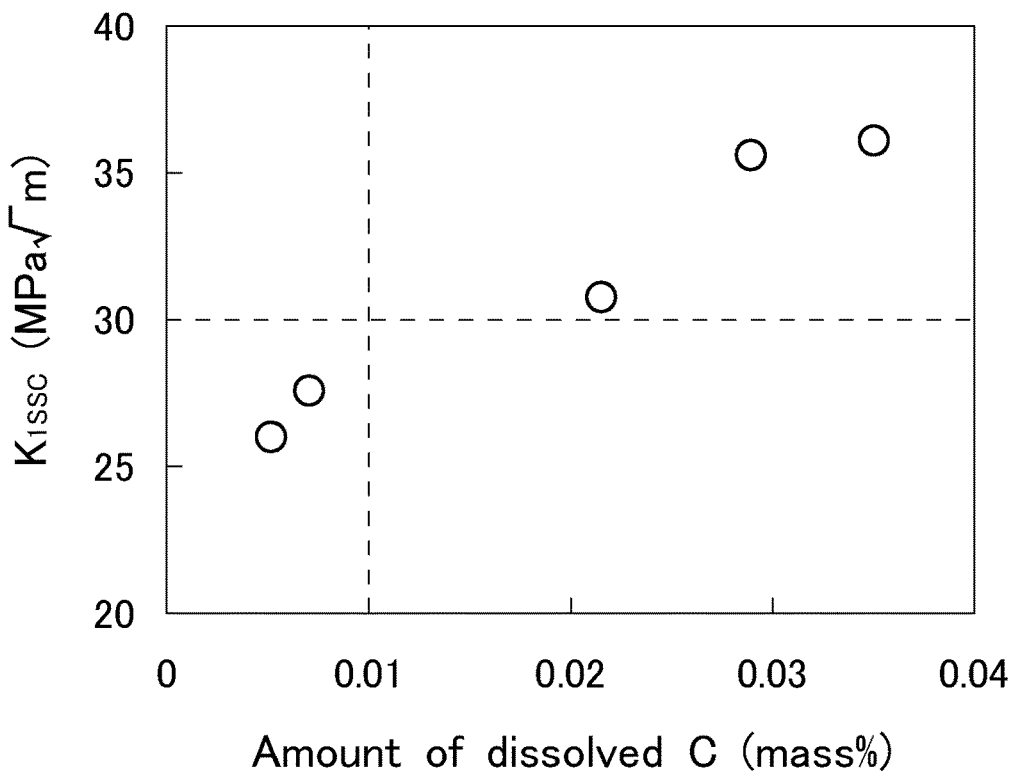
FIG. 1 is a view illustrating the relation between the amount of dissolved C and a fracture toughness value $K_{1SSC}$ for respective test numbers.

The present inventors conducted investigations and studies regarding a method for obtaining both a high yield strength in a range of 862 to less than 965 MPa (125 to less than 140 ksi) and SSC resistance in a steel material and an oil-well steel pipe, and obtained the following findings.

(a) In a steel material that has high strength, the dislocation density of the steel material increases as the strength increases. On the other hand, dislocations occlude hydrogen. Therefore, if the dislocation density of the steel material increases, the amount of hydrogen that the steel material occludes will increase. As a result, the hydrogen concentration of the steel material will increase, and the SSC resistance of the steel material will decrease. In other words, if the dislocation density of the steel material is reduced, the amount of hydrogen that the steel material occludes will decrease. As a result, the hydrogen concentration of the steel material will decrease, and the SSC resistance of the steel material will increase.

(b) On the other hand, in order to raise the yield strength YS, it is effective to increase the dislocation density of the steel material. However, as described above, if the dislocation density of the steel material is increased, the SSC resistance of the steel material will decrease. On the other hand, if dislocations of the steel material are prevented from becoming mobile dislocations, the disappearance of dislocations can be inhibited, and thus a decrease in the dislocation density can be suppressed. In this case, the strength of the steel material can be maintained. Therefore, the present inventors conceived of raising the yield strength of a steel material by making dislocations of the steel material sessile dislocations.

Specifically, the present inventors conducted studies regarding causing dislocations to become dissolved C sessile dislocations by means of C that is dissolved in the steel material (hereunder, referred to as "dissolved C"). As a result, the present inventors discovered that when the amount of dissolved C in a steel material is adjusted, there are cases in which not only does the yield strength of the steel material increase, but the SSC resistance of the steel material also increases. In other words, by adjusting the amount of dissolved C in a steel material, the SSC resistance of the steel material can be increased while maintaining the dislocation density of the steel material.

Therefore, the present inventors concluded that in order to obtain both high strength and SSC resistance in a compatible manner in a steel material, it is necessary to achieve the balance between the dislocation density and the dissolved C sessile dislocation density by appropriately controlling the amount of dissolved C. Therefore, the present inventors conducted further investigations and studies regarding a method for achieving the balance with respect to the dislocation density by appropriately controlling the amount of dissolved C.

[Relation Between Amount of Dissolved C and SSC Resistance]

Steel containing the chemical composition shown in Table 1 was subjected to hot rolling, and steel plates having a thickness of 15 mm were produced.

TABLE 1

| Chemical Composition (Unit is mass %; balance is Fe and impurities) | | | | | | | | | | | | | | | |
|---|---|---|---|---|---|---|---|---|---|---|---|---|---|---|---|
| C | Si | Mn | P | S | Al | Cr | Mo | Ti | B | N | O | V | Nb | Ni | Cu |
| 0.28 | 0.31 | 0.44 | 0.007 | 0.0005 | 0.041 | 0.50 | 0.71 | 0.013 | 0.0014 | 0.003 | 0.0013 | 0.10 | 0.012 | 0.03 | 0.01 |

After undergoing hot rolling, each steel plate was allowed to cool to make the steel plate temperature the normal temperature. The steel plate was then heated to 920° C. for quenching, and was subjected to tempering at 690° C. After tempering, the steel plate was cooled to room temperature. The respective cooling rates (° C./sec) after tempering were as shown in Table 2. The cooling after tempering was performed using a shower-type water cooling apparatus.

TABLE 2

| Test Number | Cooling Rate After Tempering (° C./sec) | YS (MPa) | TS (MPa) | YR (%) | Dissolved C Amount (mass %) | $K_{1SSC}$ (MPa√m) | | | |
|---|---|---|---|---|---|---|---|---|---|
| | | | | | | 1 | 2 | 3 | Average Value |
| 1 | 1 | 880 | 951 | 92.5 | 0.005 | 24.7 | 26.7 | 25.9 | 25.8 |
| 2 | 2 | 882 | 952 | 92.6 | 0.007 | 26.8 | 27.7 | 27.4 | 27.3 |
| 3 | 5 | 891 | 950 | 93.8 | 0.021 | 34.5 | 33.7 | 33.5 | 30.9 |
| 4 | 15 | 895 | 950 | 94.2 | 0.029 | 36.5 | 35.5 | 34.5 | 35.5 |
| 5 | 35 | 900 | 953 | 94.4 | 0.035 | 35.6 | 35.0 | 37.2 | 35.9 |

After cooling, each steel plate was subjected to a tensile test based on a test method that is described later. In addition, the amount of dissolved C (mass %) was calculated based on a test method and calculation method that are described later. Note that, the amount of dissolved C was calculated based on a difference between the C content of the relevant steel plate and the amount of C that precipitated as carbides (hereinafter, also referred to as "precipitated C amount") as described in the test method as described later. The precipitated C amount was calculated based on the residual amount and concentration in cementite of each of Fe, Cr, Mn and Mo as well as the residual amount of each of V and Nb. The residual amount (mass %) and the concentration (mass %) in cementite of the respective elements were as shown in Table 3.

TABLE 3

| Test Number | Residual Amount (mass %) | | | | | | Concentration In Cementite (mass %) | | | | Dissolved C Amount (mass %) |
|---|---|---|---|---|---|---|---|---|---|---|---|
| | Fe | Cr | Mn | Mo | V | Nb | Fe | Mn | Cr | Mo | |
| 1 | 2.65 | 0.22 | 0.12 | 0.24 | 0.07 | 0.012 | 90.1 | 2.6 | 4.1 | 3.2 | 0.005 |
| 2 | 2.60 | 0.22 | 0.13 | 0.24 | 0.07 | 0.012 | 90.1 | 2.6 | 4.1 | 3.2 | 0.007 |
| 3 | 2.43 | 0.21 | 0.11 | 0.24 | 0.07 | 0.012 | 90.1 | 3.0 | 3.7 | 3.3 | 0.021 |
| 4 | 2.35 | 0.23 | 0.11 | 0.25 | 0.07 | 0.012 | 83.4 | 3.8 | 7.5 | 5.2 | 0.029 |
| 5 | 2.26 | 0.22 | 0.10 | 0.28 | 0.07 | 0.012 | 85.2 | 2.9 | 5.6 | 6.2 | 0.035 |

In addition, a DCB test was performed based on a test method that is described later, and a fracture toughness value $K_{1SSC}$ (MPa√m) was determined for each test number. FIG. 1 is a view that illustrates the relation between the amount of dissolved C and the fracture toughness value $K_{1SSC}$ for each test number.

Referring to FIG. 1, the fracture toughness value $K_{1SSC}$ increased in accordance with an increase in the amount of dissolved C. When the amount of dissolved C was 0.010 mass % or more, the fracture toughness value $K_{1SSC}$ became 30.0 MPa√m or more, indicating excellent SSC resistance.

Figure 2:
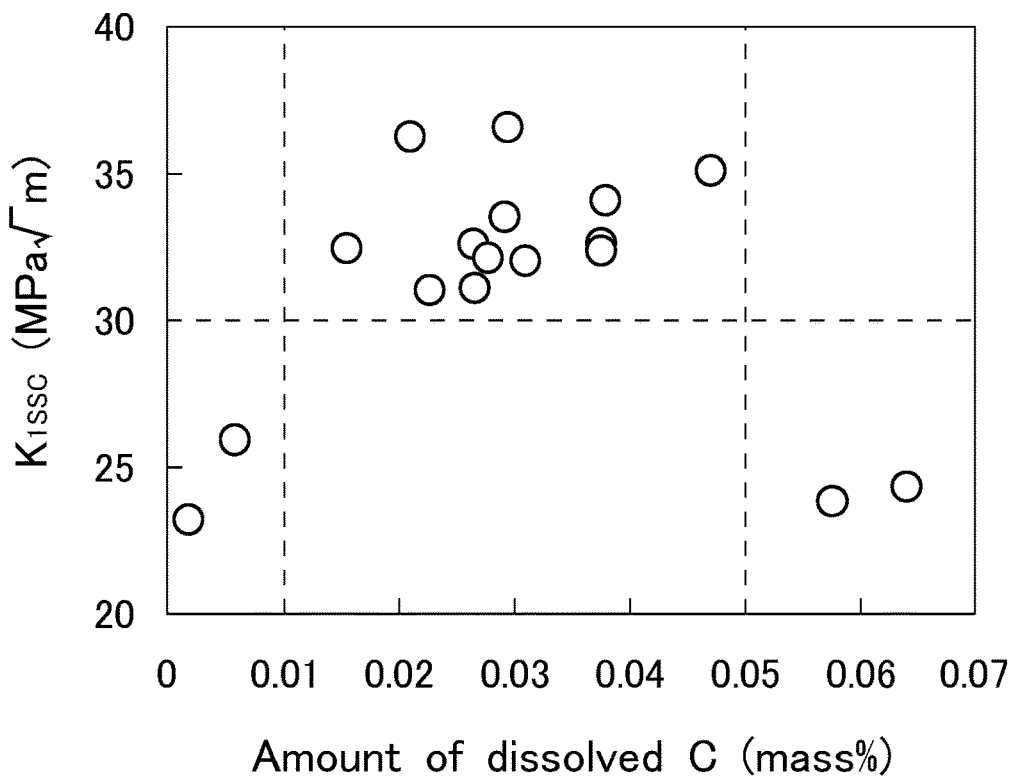
FIG. 2 is a view illustrating the relation between the amount of dissolved C and a fracture toughness value $K_{1SSC}$ for respective test numbers of the examples.

Therefore, the present inventors studied the relation between the amount of dissolved C and the SSC resistance in further detail. FIG. 2 is a view showing the relation between the amount of dissolved C and the SSC resistance for each test number of examples that are described later. FIG. 2 was created similarly to FIG. 1 using the amount of dissolved C (mass %) and the fracture toughness value $K_{1SSC}$ (MPa√m) with respect to steel materials which, among the steel materials of the examples that are described later, were steel materials containing a chemical composition within the range of the present invention and for which production conditions other than a holding time in a tempering process and a cooling rate in the tempering process were within a preferable range of the present invention.

Referring to FIG. 2, when the amount of dissolved C was 0.010 mass % or more, the fracture toughness value $K_{1SSC}$ became 30.0 MPa√m or more, indicating excellent SSC resistance. On the other hand, when the amount of dissolved C was more than 0.050 mass %, the fracture toughness value $K_{1SSC}$ was less than 30.0 MPa√m. In other words, it was clarified that when the amount of dissolved C is too high, conversely, the SSC resistance decreases.

The reason the SSC resistance decreases when the amount of dissolved C is too high as described above has not been clarified. However, with respect to the range of the chemical composition and YS of the present invention, excellent SSC resistance can be obtained if the amount of dissolved C is made 0.050 mass % or less.

Therefore, by adjusting the chemical composition and tempering conditions to obtain a YS within a range of 862 to less than 965 MPa (125 to less than 140 ksi) and also making the amount of dissolved C 0.010 to 0.050 mass %, the fracture toughness value $K_{1SSC}$ becomes 30.0 MPa√m or more and excellent SSC resistance can be obtained. Accordingly, in the present invention, the amount of dissolved C is set within the range of 0.010 to 0.050 mass %.

Note that, in order to appropriately control the amount of dissolved C and achieve the balance with respect to the dislocation density, the microstructure of the steel material is made a microstructure that is principally composed of tempered martensite and tempered bainite. The term "principally composed of tempered martensite and tempered bainite" means that the total volume ratio of tempered martensite and tempered bainite is 90% or more. When the microstructure of the steel material is principally composed of tempered martensite and tempered bainite, in the steel material of the present invention, the YS is in a range of 862 to less than 965 MPa (125 to less than 140 ksi), and a yield ratio YR (ratio between the YS and the tensile strength TS) is 90% or more.

A steel material according to the present invention that was completed based on the above findings contains a chemical composition consisting of, in mass %, C: 0.25 to 0.50%, Si: 0.05 to 0.50%, Mn: 0.05 to 1.00%, P: 0.025% or less, S: 0.0100% or less, Al: 0.005 to 0.100%, Cr: 0.30 to 1.50%, Mo: 0.25 to 1.50%, Ti: 0.002 to 0.050%, B: 0.0001 to 0.0050%, N: 0.002 to 0.010%, O: 0.0100% or less, V: 0 to 0.30%, Nb: 0 to 0.100%, Ca: 0 to 0.0100%, Mg: 0 to 0.0100%, Zr: 0 to 0.0100%, Co: 0 to 0.50%, W: 0 to 0.50%, Ni: 0 to 0.50% and Cu: 0 to 0.50%, with the balance being Fe and impurities. The steel material according to the present invention contains an amount of dissolved C within a range of 0.010 to 0.050 mass %. The yield strength is within a range of 862 to less than 965 MPa, and the yield ratio is 90% or more.

The aforementioned chemical composition may contain one or more types of element selected from the group consisting of V: 0.01 to 0.30% and Nb: 0.002 to 0.100%.

The aforementioned chemical composition may contain one or more types of element selected from the group consisting of Ca: 0.0001 to 0.0100%, Mg: 0.0001 to 0.0100% and Zr: 0.0001 to 0.0100%.

The aforementioned chemical composition may contain one or more types of element selected from the group consisting of Co: 0.02 to 0.50% and W: 0.02 to 0.50%.

The aforementioned chemical composition may contain one or more types of element selected from the group consisting of Ni: 0.02 to 0.50% and Cu: 0.01 to 0.50%.

The aforementioned steel material may be an oil-well steel pipe that contains the aforementioned chemical composition and contains 0.010 to 0.050 mass % of dissolved C, and has a yield strength in a range of 862 to less than 965 MPa and a yield ratio of 90% or more.

The oil-well steel pipe may be a steel pipe that is used for a line pipe or may be a steel pipe used for oil country tubular goods (OCTG). The oil-well steel pipe may be a seamless steel pipe. The oil country tubular goods are, for example, casing or tubing.

If the oil-well steel pipe according to the present invention contains the aforementioned chemical composition, the oil-well steel pipe will exhibit excellent strength and excellent SSC resistance even if the wall thickness is 15 mm or more.

The term "excellent SSC resistance" mentioned above means, specifically, that a value of $K_{1SSC}$ (MPa√m) is 30.0 MPa√m or more in a DCB test performed in accordance with "Method D" described in NACE TM0177-2005 using an autoclave in which a solution obtained by mixing a degassed 5% saline solution and 4 g/L of sodium acetate and adjusting to pH 3.5 using hydrochloric acid, and a gaseous mixture consisting of 10% $H_2S$ gas and 90% $CO_2$ gas at a total pressure of 1 atm were sealed.

Further, the term "amount of dissolved C" mentioned above means the difference between the amount of C (mass %) in carbides in the steel material and the C content of the chemical composition of the steel material. The amount of C in carbides in the steel material is determined by Formula (1) to Formula (5) using an Fe concentration <Fe>a, a Cr concentration <Cr>a, an Mn concentration <Mn>a, an Mo concentration <Mo>a, a V concentration <V>a and an Nb concentration <Nb>a in carbides (cementite and MC-type carbides) obtained as residue when extraction residue analysis is performed on the steel material, and an Fe concentration <Fe>b, a Cr concentration <Cr>b, an Mn concentration <Mn>b and an Mo concentration <Mo>b in cementite obtained by performing point analysis by EDS with respect to cementite identified by performing TEM observation of a replica film obtained by an extraction replica method.

$$<Mo>c=(<Fe>a+<Cr>a+<Mn>a)\times <Mo>b/(<Fe>b+<Cr>b+<Mn>b) \quad (1)$$

$$<Mo>d=<Mo>a-<Mo>c \quad (2)$$

$$<C>a=(<Fe>a/55.85+<Cr>a/52+<Mn>a/53.94+<Mo>c/95.9)/3\times 12 \quad (3)$$

$$<C>b=(<V>a/50.94+<Mo>d/95.9+<Nb>a/92.9)\times 12 \quad (4)$$

$$(\text{amount of dissolved C})=<C>-(<C>a+<C>b) \quad (5)$$

Note that, in the present description, the term "cementite" means carbides containing an Fe content of 50 mass % or more.

The method for producing a steel material according to the present invention includes a preparation process, a quenching process and a tempering process. In the preparation process, an intermediate steel material containing the aforementioned chemical composition is prepared. In the quenching process, after the preparation process, the intermediate steel material that is at a temperature in a range of 800 to 1000° C. is cooled at a cooling rate of 300° C./min or more. In the tempering process, the intermediate steel material after quenching is held at a temperature in a range of 670° C. to the $A_{c1}$ point for 10 to 180 minutes, and thereafter the intermediate steel material is cooled at an average cooling rate of 5 to 100° C./sec with respect to cooling from 600° C. to 200° C.

The preparation process of the aforementioned production method may include a starting material preparation process of preparing a starting material containing the aforementioned chemical composition, and a hot working process of subjecting the starting material to hot working to produce an intermediate steel material.

Hereunder, the steel material and the oil-well steel pipe of the present invention are described in detail. The symbol "%" in relation to an element means "mass percent" unless specifically stated otherwise.

[Chemical Composition]

The chemical composition of the steel material according to the present invention contains the following elements.

C: 0.25 to 0.50%

Carbon (C) enhances the hardenability and increases the strength of the steel material. If the C content is 0.25% or more, on the condition that the contents of other elements are within the range defined in the present invention, the yield strength can be made 862 Mpa or more. C also promotes spheroidization of carbides during tempering in the production process, and increases the SSC resistance of the steel material. If the carbides are dispersed, the strength of the steel material increases further. These effects will not be obtained if the C content is too low. On the other hand, if the C content is too high, the toughness of the steel material will decrease and quench cracking is liable to occur. Therefore, the C content is within the range of 0.25 to 0.50%. A preferable upper limit of the C content is 0.45%, and more preferably is 0.40%.

Si: 0.05 to 0.50%

Silicon (Si) deoxidizes the steel. If the Si content is too low, this effect is not obtained. On the other hand, if the Si content is too high, the SSC resistance of the steel material decreases. Therefore, the Si content is within the range of 0.05 to 0.50%. A preferable lower limit of the Si content is 0.15%, and more preferably is 0.20%. A preferable upper limit of the Si content is 0.45%, and more preferably is 0.40%.

Mn: 0.05 to 1.00%

Manganese (Mn) deoxidizes the steel material. Mn also enhances the hardenability. If the Mn content is too low, these effects are not obtained. On the other hand, if the Mn content is too high, Mn segregates at grain boundaries together with impurities such as P and S. In such a case, the SSC resistance of the steel material will decrease. Therefore, the Mn content is within a range of 0.05 to 1.00%. A preferable lower limit of the Mn content is 0.25%, and more preferably is 0.30%. A preferable upper limit of the Mn content is 0.90%, and more preferably is 0.80%.

P: 0.025% or less

Phosphorous (P) is an impurity. P segregates at the grain boundaries and decreases the SSC resistance of the steel material. Therefore, the P content is 0.025% or less. A preferable upper limit of the P content is 0.020%, and more preferably is 0.015%. Preferably, the P content is as low as possible. The lower limit of the P content is, for example, 0.003%.

S: 0.0100% or less

Sulfur (S) is an impurity. S segregates at the grain boundaries and decreases the SSC resistance of the steel material. Therefore, the S content is 0.0100% or less. A preferable upper limit of the S content is 0.0050%, and more preferably is 0.0030%. Preferably, the S content is as low as possible. The lower limit of the S content is, for example, 0.0003%.

Al: 0.005 to 0.100%

Aluminum (Al) deoxidizes the steel material. If the Al content is too low, this effect is not obtained and the SSC resistance of the steel material decreases. On the other hand, if the Al content is too high, coarse oxide-based inclusions are formed and the SSC resistance of the steel material decreases. Therefore, the Al content is within a range of 0.005 to 0.100%. A preferable lower limit of the Al content is 0.015%, and more preferably is 0.020%. A preferable upper limit of the Al content is 0.080%, and more preferably is 0.060%. In the present description, the "Al" content means "acid-soluble Al", that is, the content of "sol. Al".

Cr: 0.30 to 1.50%

Chromium (Cr) enhances the hardenability of the steel material and increases the strength of the steel material. Cr also increases temper softening resistance and enables high-temperature tempering. As a result, the SSC resistance of the steel material increases. If the Cr content is too low, these effects are not obtained. On the other hand, if the Cr content is too high, the toughness and SSC resistance of the steel material decreases. Therefore, the Cr content is within a range of 0.30 to 1.50%. A preferable lower limit of the Cr content is 0.35%, and more preferably is 0.40%. A preferable upper limit of the Cr content is 1.30%.

Mo: 0.25 to 1.50%

Molybdenum (Mo) enhances the hardenability of the steel material. Mo also forms fine carbides and increases the temper softening resistance of the steel material. As a result, Mo increases the SSC resistance by high temperature tempering. If the Mo content is too low, these effects are not obtained. On the other hand, if the Mo content is too high, the aforementioned effects are saturated. Therefore, the Mo content is within a range of 0.25 to 1.50%. A preferable lower limit of the Mo content is 0.50%, and more preferably is 0.65%. A preferable upper limit of the Mo content is 1.20%, and more preferably is 1.00%.

Ti: 0.002 to 0.050%

Titanium (Ti) forms nitrides, and refines crystal grains by the pinning effect. As a result, the strength of the steel material increases. If the Ti content is too low, this effect is not obtained. On the other hand, if the Ti content is too high, Ti nitrides coarsen and the SSC resistance of the steel material decreases. Therefore, the Ti content is within a range of 0.002 to 0.050%. A preferable lower limit of the Ti content is 0.003%, and more preferably is 0.005%. A preferable upper limit of the Ti content is 0.030%, and more preferably is 0.020%.

B: 0.0001 to 0.0050%

Boron (B) dissolves in the steel, enhances the hardenability of the steel material and increases the steel material strength. This effect is not obtained if the B content is too low. On the other hand, if the B content is too high, coarse nitrides form and the SSC resistance of the steel material decreases. Therefore, the B content is within a range of 0.0001 to 0.0050%. A preferable lower limit of the B content is 0.0003%, and more preferably is 0.0007%. A preferable upper limit of the B content is 0.0035%, and more preferably is 0.0025%.

N: 0.002 to 0.010%

Nitrogen (N) is unavoidably contained. N forms coarse nitrides and decreases the SSC resistance of the steel material. Therefore, the N content is within the range of 0.002 to 0.010%. A preferable upper limit of the N content is 0.005%, and more preferably is 0.004%. Preferably, the N content is as low as possible. However, in a case where a certain amount of Ti is contained, an amount of 0.002% or more of N is contained in order to cause refinement of grains by precipitation of fine nitrides.

O: 0.0100% or less

Oxygen (O) is an impurity. O forms coarse oxides and reduces the corrosion resistance of the steel material. Therefore, the O content is 0.0100% or less. A preferable upper limit of the O content is 0.0030%, and more preferably is 0.0020%. Preferably, the O content is as low as possible. The lower limit of the O content is, for example, 0.0003%.

The balance of the chemical composition of the steel material according to the present invention is Fe and impurities. Here, the term "impurities" refers to elements which, during industrial production of the steel material, are mixed in from ore or scrap that is used as a raw material of the steel material, or from the production environment or the like, and which are allowed within a range that does not adversely affect the steel material of the present invention.

[Regarding Optional Elements]

The chemical composition of the steel material described above may further contain one or more types of element selected from the group consisting of V and Nb in lieu of a part of Fe. Each of these elements is an optional element, and increases the SSC resistance of the steel material.

V: 0 to 0.30%

Vanadium (V) is an optional element, and need not be contained. If contained, V combines with C or N to form carbides, nitrides or carbo-nitrides and the like (hereinafter, referred to as "carbo-nitrides and the like"). These carbo-nitrides and the like refine the substructure of the steel material by the pinning effect, and improve the SSC resistance of the steel. V also forms fine carbides during tempering. The fine carbides increase the temper softening resistance of the steel material, and increase the strength of the steel material. In addition, because V also forms spherical MC-type carbides, V suppresses the formation of acicular $M_2C$-type carbides and thereby increases the SSC resistance. If even a small amount of V is contained, these effects are obtained to a certain extent. However, if the V content is too high, the toughness of the steel material decreases. Therefore, the V content is within the range of 0 to 0.30%. A preferable lower limit of the V content is 0.01%, and more preferably is 0.02%. A preferable upper limit of the V content is 0.15%, and more preferably is 0.12%.

Nb: 0 to 0.100%

Niobium (Nb) is an optional element, and need not be contained. If contained, Nb forms carbo-nitrides and the like. These carbo-nitrides and the like refine the substructure of the steel material by the pinning effect, and increase the SSC resistance of the steel material. In addition, because Nb also forms spherical MC-type carbides, Nb suppresses the formation of acicular $M_2C$-type carbides and thereby increases the SSC resistance. If even a small amount of Nb is contained, these effects are obtained to a certain extent. However, if the Nb content is too high, nitrides are excessively formed and the SSC resistance of the steel material decreases. Therefore, the Nb content is within the range of 0 to 0.100%. A preferable lower limit of the Nb content is 0.002%, more preferably is 0.003%, and further preferably is 0.007%. A preferable upper limit of the Nb content is less than 0.050%, more preferably is 0.025%, and further preferably is 0.020%.

A total of the contents of the aforementioned V and Nb is preferably 0.2% or less, and further preferably is 0.15% or less.

The chemical composition of the steel material described above may further contain one or more types of element selected from the group consisting of Ca, Mg and Zr in lieu of a part of Fe. Each of these elements is an optional element, and increases the SSC resistance of the steel material.

Ca: 0 to 0.0100%

Calcium (Ca) is an optional element, and need not be contained. If contained, Ca refines sulfides in the steel material and increases the SSC resistance of the steel material. If even a small amount of Ca is contained, this effect is obtained to a certain extent. However, if the Ca content is too high, oxides in the steel material coarsen and the SSC resistance of the steel material decreases. Therefore, the Ca content is within the range of 0 to 0.0100%. A preferable lower limit of the Ca content is 0.0001%, more preferably is 0.0003%, and further preferably is 0.0006%. A preferable upper limit of the Ca content is 0.0025, and more preferably is 0.0020%.

Mg: 0 to 0.0100%

Magnesium (Mg) is an optional element, and need not be contained. If contained, Mg renders S in the steel material harmless by forming sulfides, and increases the SSC resistance of the steel material. If even a small amount of Mg is contained, this effect is obtained to a certain extent. However, if the Mg content is too high, oxides in the steel material coarsen and decrease the SSC resistance of the steel material. Therefore, the Mg content is within the range of 0 to 0.0100%. A preferable lower limit of the Mg content is 0.0001%, more preferably is 0.0003%, further preferably is 0.0006%, and even further preferably is 0.0010%. A preferable upper limit of the Mg content is 0.0025%, and more preferably is 0.0020%.

Zr: 0 to 0.0100%

Zirconium (Zr) is an optional element, and need not be contained. If contained, Zr refines sulfides in the steel material and increases the SSC resistance of the steel material. If even a small amount of Zr is contained, this effect is obtained to a certain extent. However, if the Zr content is too high, oxides in the steel material coarsen and the SSC resistance of the steel material decreases. Therefore, the Zr content is within the range of 0 to 0.0100%. A preferable lower limit of the Zr content is 0.0001%, more preferably is 0.0003%, and further preferably is 0.0006%. A preferable upper limit of the Zr content is 0.0025%, and more preferably is 0.0020%.

In a case where two or more types of element selected from the aforementioned group containing Ca, Mg and Zr are contained in combination, the total amount of these elements is preferably 0.01% or less, and more preferably is 0.005% or less.

The chemical composition of the steel material described above may further contain one or more types of element selected from the group consisting of Co and W in lieu of a part of Fe. Each of these elements is an optional element that forms a protective corrosion coating in a hydrogen sulfide environment and suppresses hydrogen penetration. By this means, each of these elements increases the SSC resistance of the steel material.

Co: 0 to 0.50%

Cobalt (Co) is an optional element, and need not be contained. If contained, Co forms a protective corrosion coating in a hydrogen sulfide environment and suppresses hydrogen penetration. By this means, Co increases the SSC resistance of the steel material. If even a small amount of Co is contained, this effect is obtained to a certain extent. However, if the Co content is too high, the hardenability of the steel material will decrease, and the steel material strength will decrease. Therefore, the Co content is within the range of 0 to 0.50%. A preferable lower limit of the Co content is 0.02%, and more preferably is 0.05%. A preferable upper limit of the Co content is 0.45%, and more preferably is 0.40%.

W: 0 to 0.50%

Tungsten (W) is an optional element, and need not be contained. If contained, W forms a protective corrosion coating in a hydrogen sulfide environment and suppresses hydrogen penetration. By this means, W increases the SSC resistance of the steel material. If even a small amount of W is contained, this effect is obtained to a certain extent. However, if the W content is too high, coarse carbides form and the SSC resistance of the steel material decreases. Therefore, the W content is within the range of 0 to 0.50%. A preferable lower limit of the W content is 0.02%, and more preferably is 0.05%. A preferable upper limit of the W content is 0.45%, and more preferably is 0.40%.

The chemical composition of the steel material described above may further contain one or more types of element selected from the group consisting of Ni and Cu in lieu of a part of Fe. Each of these elements is an optional element, and increases the hardenability of the steel.

Ni: 0 to 0.50%

Nickel (Ni) is an optional element, and need not be contained. If contained, Ni enhances the hardenability of the steel material and increases the steel material strength. If even a small amount of Ni is contained, this effect is obtained to a certain extent. However, if the Ni content is too high, the Ni will promote local corrosion, and the SSC resistance will decrease. Therefore, the Ni content is within the range of 0 to 0.50%. A preferable lower limit of the Ni content is 0.02%, and more preferably is 0.05%. A preferable upper limit of the Ni content is 0.35%, and more preferably is 0.25%.

Cu: 0 to 0.50%

Copper (Cu) is an optional element, and need not be contained. If contained, Cu enhances the hardenability of the steel material and increases the steel material strength. If even a small amount of Cu is contained, this effect is obtained to a certain extent. However, if the Cu content is too high, the hardenability will be too high, and the SSC resistance will decrease. Therefore, the Cu content is within the range of 0 to 0.50%. A preferable lower limit of the Cu content is 0.01%, more preferably is 0.02%, and further preferably is 0.05%. A preferable upper limit of the Cu content is 0.35%, and more preferably is 0.25%.

[Amount of Dissolved C]

In the present invention, the amount of dissolved C is within the range of 0.010 to 0.050 mass %. If the amount of dissolved C is less than 0.010 mass %, the immobilization of crystal dislocations will be insufficient and the SSC resistance of the steel material will decrease. On the other hand, if the amount of dissolved C is more than 0.050 mass %, conversely, the SSC resistance of the steel material will decrease. Therefore, the amount of dissolved C is within the range of 0.010 to 0.050 mass %. A preferable lower limit of the amount of dissolved C is 0.020 mass %, and more preferably is 0.030 mass %.

An amount of dissolved C within the aforementioned range is obtained by, for example, controlling the holding time for tempering and controlling the cooling rate after tempering. The reason is as described hereinafter.

In the tempering process, if the holding time during tempering is short, the tempering will be insufficient. In such a case, precipitation of carbides in the steel material will be insufficient, and the amount of dissolved C will be too high. As a result, the SSC resistance of the steel material will decrease. On the other hand, if the holding time during tempering is too long, these effects will be saturated. Therefore, the holding time during tempering is in the range of 10 to 180 minutes.

In the tempering process, if the cooling rate for cooling after tempering is slow, dissolved C will reprecipitate while the temperature is decreasing. In the conventional methods for producing steel material, because cooling after tempering has been performed by allowing the steel material to cool, the cooling rate has been slow. Consequently, the amount of dissolved C has been almost 0 mass %. Therefore, in the present embodiment, the cooling rate after tempering is raised, and a dissolved C amount in the range of 0.010 to 0.050 mass % is obtained.

The cooling method is, for example, a method that performs forced cooling of a hollow shell continuously from the tempering temperature to thereby continuously decrease the surface temperature of the steel material. Examples of this kind of continuous cooling treatment include a method that cools the steel material by immersion in a water bath, and a method that cools the steel material in an accelerated manner by shower water cooling, mist cooling or forced air cooling.

The cooling rate after tempering is measured at a region that is most slowly cooled within a cross-section of the steel material that is tempered (for example, in the case of forcedly cooling both surfaces, the cooling rate is measured at the center portion of the steel material thickness). Specifically, in a case where the steel material is a steel plate, the cooling rate after tempering can be measured by inserting a sheath-type thermocouple into the center of the thickness of the steel plate and measuring the temperature. In a case where the steel material is a steel pipe, the cooling rate after tempering can be measured by inserting a sheath-type thermocouple into the center of the wall thickness of the steel pipe and measuring the temperature. Further, in a case of forcedly cooling only a surface on one side of the steel material, the surface temperature on the non-forcedly cooled side of the steel material can be measured by means of a non-contact type infrared thermometer.

The temperature region from 600° C. to 200° C. is a temperature region in which diffusion of C is comparatively fast. Therefore, the average cooling rate in the temperature region from 600° C. to 200° C. is 5° C./sec or more. A preferable lower limit of the cooling rate after tempering is 10° C./sec, and more preferably is 15° C./sec.

On the other hand, if the cooling rate after tempering is too fast, very little of the C that had dissolved after being held during tempering precipitates. As a result, in some cases the amount of dissolved C is excessive. Therefore, the cooling rate after tempering is not more than 100° C./sec. A preferable upper limit of the cooling temperature after tempering is 50° C./sec, and more preferably is 40° C./sec.

In this case, the amount of dissolved C can be made to fall within the range of 0.010 to 0.050 mass %.

[Method for Calculating Amount of Dissolved C]

The term "amount of dissolved C" means the difference between the amount of C (mass %) in carbides in the steel material and the C content of the chemical composition of the steel material. The amount of C in carbides in the steel material is determined by Formula (1) to Formula (5) using an Fe concentration $<Fe>a$, a Cr concentration $<Cr>a$, an Mn concentration $<Mn>a$, an Mo concentration $<Mo>a$, a V concentration $<V>a$ and an Nb concentration $<Nb>a$ in carbides (cementite and MC-type carbides) obtained as residue when extraction residue analysis is performed on the steel material, and an Fe concentration $<Fe>b$, a Cr concentration $<Cr>b$, an Mn concentration $<Mn>b$ and an Mo concentration $<Mo>b$ in cementite obtained by performing point analysis by EDS with respect to cementite identified by performing TEM observation of a replica film obtained by an extraction replica method.

$$<Mo>c = (<Fe>a + <Cr>a + <Mn>a) \times <Mo>b/(<Fe>b + <Cr>b + <Mn>b) \quad (1)$$

$$<Mo>d = <Mo>a - <Mo>c \quad (2)$$

$$<C>a = (<Fe>a/55.85 + <Cr>a/52 + <Mn>a/53.94 + <Mo>c/95.9)/3 \times 12 \quad (3)$$

$$<C>b = (<V>a/50.94 + <Mo>d/95.9 + <Nb>a/92.9) \times 12 \quad (4)$$

$$(\text{amount of dissolved C}) = <C> - (<C>a + <C>b) \quad (5)$$

Note that, in the present description, the term "cementite" means carbides containing an Fe content of 50 mass % or more. Hereunder, the method for calculating the amount of dissolved C is described in detail.

[Determination of C Content of Steel Material]

In a case where the steel material is a plate material, an analysis sample having the shape of a machined chip is taken from a center portion of the plate thickness. The C content (mass %) is analyzed by an oxygen-stream combustion-infrared absorption method. The resulting value was taken to be the C content ($<C>$) of the steel material.

[Calculation of C Amount that Precipitates as Carbides (Precipitated C Amount)]

The precipitated C amount is calculated by the following procedures 1 to 4. Specifically, in procedure 1 an extraction residue analysis is performed. In procedure 2, an extraction replica method using a transmission electron microscope (hereunder, referred to as "TEM"), and an element concentration analysis (hereunder, referred to as "EDS analysis") of elements in cementite is performed by energy dispersive X-ray spectrometry (hereunder, referred to as "EDS"). In procedure 3, the Mo content is adjusted. In procedure 4, the precipitated C amount is calculated.

[Procedure 1. Determination of Residual Amounts of Fe, Cr, Mn, Mo, V and Nb by Extraction Residue Analysis]

In procedure 1, carbides in the steel material are captured as residue, and the contents of Fe, Cr, Mn, Mo, V and Nb in the residue are determined. Here, the term "carbides" is a generic term for cementite ($M_3C$-type carbides) and MC-type carbides. The specific procedure is as follows. In a case where the steel material is a plate material, a cylindrical test specimen having a diameter of 6 mm and a length of 50 mm is extracted from a center portion of the plate thickness. In a case where the steel material is a steel pipe, a cylindrical test specimen having a diameter of 6 mm and a length of 50 mm is extracted from a center portion of the wall thickness of the steel pipe in a manner so that the center of the wall thickness becomes the center of the cross-section. The surface of the extracted test specimen is polished to remove about 50 µm by preliminary electropolishing to obtain a newly formed surface. The electropolished test specimen is subjected to electrolysis in an electrolyte solution of 10% acetylacetone+1% tetra-ammonium+methanol. The electrolyte solution after electrolysis is passed through a 0.2-µm filter to capture residue. The obtained residue is subjected to acid decomposition, and the concentrations of Fe, Cr, Mn, Mo, V and Nb are determined in units of mass percent by ICP (inductively coupled plasma) optical emission spectrometry. The concentrations are defined as <Fe>a, <Cr>a, <Mn>a, <Mo>a, <V>a and <Nb>a, respectively.

[Procedure 2. Determination of Content of Fe, Cr, Mn and Mo in Cementite by Extraction Replica Method and EDS]

In procedure 2, the content of each of Fe, Cr, Mn and Mo in cementite is determined. The specific procedure is as follows. A micro test specimen is cut out from a center portion of the plate thickness in a case where the steel material is a plate material, and is cut out from a center portion of the wall thickness in a case where the steel material is a steel pipe, and the surface of the micro test specimen is finished by mirror polishing. The test specimen is immersed for 10 minutes in a 3% nital etching reagent, to etch the surface. The surface thereof is covered with a carbon deposited film. The test specimen whose surface is covered with the deposited film is immersed in a 5% nital etching reagent, and held therein for 20 minutes to cause the deposited film to peel off. The deposited film that peeled off is cleaned with ethanol, and thereafter is scooped up with a sheet mesh and dried. The deposited film (replica film) is observed using a TEM, and point analysis by EDS is performed with respect to 20 particles of cementite. The concentration of each of Fe, Cr, Mn and Mo is determined in units of mass percent when taking the total of the alloying elements excluding carbon in the cementite as 100%. The concentrations are determined for 20 particles of cementite, and the arithmetic average values for the respective elements are defined as <Fe>b, <Cr>b, <Mn>b and <Mo>b.

[Procedure 3. Adjustment of Mo Amount]

Next, the Mo concentration in the carbides is determined. In this case, Fe, Cr, Mn and Mo concentrate in cementite. On the other hand, V, Nb and Mo concentrate in MC-type carbides. In other words, Mo is caused to concentrate in both cementite and MC-type carbides by tempering. Therefore, the Mo amount is calculated separately for cementite and for MC-type carbides. Note that, in some cases a part of V also concentrates in cementite. However, the amount of V that concentrates in cementite is negligibly small in comparison to the amount of V that concentrates in MC-type carbides. Therefore, when determining the amount of dissolved C, V is regarded as concentrating only in MC-type carbides.

Specifically, the amount of Mo precipitating as cementite (<Mo>c) is calculated by Formula (1).

$$<Mo>c=(<Fe>a+<Cr>a+<Mn>a)\times<Mo>b/(<Fe>b+<Cr>b+<Mn>b) \quad (1)$$

On the other hand, the amount of Mo precipitating as MC-type carbides (<Mo>d) is calculated in units of mass percent by Formula (2).

$$<Mo>d=<Mo>a-<Mo>c \quad (2)$$

[Procedure 4. Calculation of Precipitated C Amount]

The precipitated C amount is calculated as the total of the C amount precipitating as cementite (<C>a) and the C amount precipitating as MC-type carbides (<C>b). <C>a and <C>b are calculated in units of mass percent by Formula (3) and Formula (4), respectively. Note that, Formula (3) is a formula that is derived from the fact that the structure of cementite is a $M_3C$ type structure (M include Fe, Cr, Mn and Mo).

$$<C>a=(<Fe>a/55.85+<Cr>a/52+<Mn>a/53.94+<Mo>c/95.9)/3\times12 \quad (3)$$

$$<C>b=(<V>a/50.94+<Mo>d/95.9+<Nb>a/92.9)\times12 \quad (4)$$

Thus, the precipitated C amount is <C>a+<C>b.

[Calculation of Amount of Dissolved C]

The amount of dissolved C (hereunder, also referred to as "<C>c") is calculated in units of mass percent by Formula (5) as a difference between the C content (<C>) and the precipitated C amount of the steel material.

$$<C>c=<C>-(<C>a+<C>b) \quad (5)$$

[Microstructure]

The microstructure of the steel material of the present invention is principally composed of tempered martensite and tempered bainite. More specifically, the volume ratio of tempered martensite and/or tempered bainite in the microstructure is 90% or more. In other words, the total of the volume ratios of tempered martensite and tempered bainite in the microstructure is 90% or more. The balance of the microstructure is, for example, retained austenite or the like. If the microstructure of the steel material containing the aforementioned chemical composition contains tempered martensite and tempered bainite in an amount equivalent to a total volume ratio of 90% or more, the YS will be 862 to less than 965 MPa (125 to less than 140 ksi) and the YR will be 90% or more. Therefore, in the present embodiment, if the YS is 862 to less than 965 MPa (125 to less than 140 ksi) and the YR is 90% or more, it is assumed that the total of the volume ratios of tempered martensite and tempered bainite in the microstructure is 90% or more. Preferably, the microstructure is composed of only tempered martensite and/or tempered bainite.

Note that, the following method can be adopted in the case of determining the total of the volume ratios of tempered martensite and tempered bainite by observation. In a case where the steel material is a plate material, a small piece having an observation surface with dimensions of 10 mm in the rolling direction and 10 mm in the plate width direction is cut out from a center portion of the plate thickness. In a case where the steel material is a steel pipe, a small piece having an observation surface with dimensions of 10 mm in the pipe axis direction and 10 mm in the pipe circumferential direction is cut out from a center portion of the wall thickness. After polishing the observation surface to obtain a mirror surface, the small piece is immersed for about 10 seconds in a nital etching reagent, to reveal the microstructure by etching. The etched observation surface is observed by means of a secondary electron image obtained using a scanning electron microscope (SEM). Observation is performed for 10 visual fields, with each visual field being set as 400 µm² (magnification of ×5000). In each visual field, tempered martensite and tempered bainite are identified based on the contrast. The total of the area fractions of tempered martensite and tempered bainite that are identified is taken as the area fraction of tempered martensite and tempered bainite of each visual field. In the present embodiment, the arithmetic average value of the totals of the area fractions of tempered martensite and tempered bainite determined in each visual field is taken as the volume ratio of tempered martensite and tempered bainite.

[Shape of Steel Material]

The shape of the steel material of the present embodiment is not particularly limited. The steel material is, for example, a steel pipe or a steel plate. In a case where the steel material is an oil-well steel pipe, a preferable wall thickness is 9 to 60 mm. The present invention is, in particular, suitable for use as a heavy-wall oil-well steel pipe. More specifically, even if the steel material according to the present invention is an oil-well steel pipe having a thick wall of 15 mm or more or, furthermore, 20 mm or more, the steel material exhibits excellent strength and SSC resistance.

[YS and YR of Steel Material]

The YS of the steel material of the present embodiment is 862 to less than 965 MPa (125 to less than 140 ksi), and the YR of the steel material is 90% or more. In the present description, "YS" means the stress when elongation of 0.65% is obtained in a tensile test. In short, the strength of the steel material of the present embodiment is of 125 ksi grade. Even though the steel material of the present embodiment has such high strength, the steel material also has excellent SSC resistance by satisfying the conditions regarding the chemical composition, amount of dissolved C and microstructure, which are described above.

[SSC Resistance of Steel Material]

The SSC resistance of the steel material of the present embodiment can be evaluated by a DCB test performed in accordance with "Method D" described in NACE TM0177-2005. The liquid solution used is obtained by mixing a degassed 5% saline solution and 4 g/L of sodium acetate and adjusting to pH 3.5 using hydrochloric acid. The gas charged inside the autoclave is a gaseous mixture of 10% $H_2S$ gas and 90% $CO_2$ gas at a total pressure of 1 atm. Thereafter, a DCB test specimen into which a wedge was driven is enclosed inside the container, and is held for three weeks at 24° C. while agitating the liquid solution and also continuously blowing in the aforementioned gaseous mixture. The $K_{1SSC}$ (MPa$\sqrt{m}$) value of the steel material of the present embodiment determined under the foregoing conditions is 30.0 MPa$\sqrt{m}$ or more.

[Production Method]

The method for producing a steel material of the present invention includes a preparation process, a quenching process and a tempering process. The preparation process may include a starting material preparation process and a hot working process. In the present embodiment, a method for producing an oil-well steel pipe will be described as one example of a method for producing a steel material. The method for producing an oil-well steel pipe includes a process of preparing a hollow shell (preparation process), and a process of subjecting the hollow shell to quenching and tempering to obtain an oil-well steel pipe (quenching process and tempering process). Each of these processes is described in detail hereunder.

[Preparation Process]

In the preparation process, an intermediate steel material containing the aforementioned chemical composition is prepared. The method for producing the intermediate steel material is not particularly limited as long as the intermediate steel material has the aforementioned chemical composition. As used here, the term "intermediate steel material" refers to a plate-shaped steel material in a case where the end product is a steel plate, and refers to a hollow shell in a case where the end product is a steel pipe.

The preparation process may preferably include a process in which a starting material is prepared (starting material preparation process), and a process in which the starting material is subjected to hot working to produce an intermediate steel material (hot working process). Hereunder, a case in which the preparation process includes the starting material preparation process and the hot working process is described in detail.

[Starting Material Preparation Process]

In the starting material preparation process, a starting material is produced using molten steel containing the aforementioned chemical composition. Specifically, a cast piece (a slab, bloom or billet) is produced by a continuous casting process using the molten steel. An ingot may also be produced by an ingot-making process using the molten steel. As necessary, the slab, bloom or ingot may be subjected to blooming to produce a billet. The starting material (a slab, bloom or billet) is produced by the above described process.

[Hot Working Process]

In the hot working process, the starting material that was prepared is subjected to hot working to produce an intermediate steel material. In a case where the steel material is a steel pipe, the intermediate steel material corresponds to a hollow shell. First, the billet is heated in a heating furnace. Although the heating temperature is not particularly limited, for example, the heating temperature is within a range of 1100 to 1300° C. The billet that is extracted from the heating furnace is subjected to hot working to produce a hollow shell (seamless steel pipe). For example, the Mannesmann process is performed as the hot working to produce the hollow shell. In this case, a round billet is piercing-rolled using a piercing machine. When performing piercing-rolling, although the piercing ratio is not particularly limited, the piercing ratio is, for example, within a range of 1 to 4. The round billet that underwent piercing-rolling is further hot-rolled to form a hollow shell using a mandrel mill, a reducer, a sizing mill or the like. The cumulative reduction of area in the hot working process is, for example, 20 to 70%.

A hollow shell may also be produced from the billet by another hot working method. For example, in the case of a heavy-wall steel material of a short length such as a coupling, a hollow shell may be produced by forging. A hollow shell having a wall thickness of 9 to 60 mm is produced by the above process.

The hollow shell produced by hot working may be air-cooled (as-rolled). The steel pipe produced by hot working may be subjected to direct quenching after hot rolling without being cooled to normal temperature, or may be subjected to quenching after undergoing supplementary heating (reheating) after hot rolling. However, in the case of performing direct quenching or quenching after supplementary heating, it is preferable to stop the cooling midway through the quenching process and conduct slow cooling for the purpose of suppressing quench cracking.

In a case where direct quenching is performed after hot rolling, or quenching is performed after supplementary heating after hot rolling, for the purpose of eliminating residual stress it is preferable to perform a stress relief treatment (SR treatment) at a time that is after quenching and before the heat treatment of the next process. The quenching process is described in detail hereunder.

In the quenching process, the intermediate steel material that was prepared is subjected to quenching. In the present description, the term "quenching" means rapidly cooling the intermediate steel material that is at a temperature not less than the $A_3$ point. A preferable quenching temperature is 800 to 1000° C. In a case where direct quenching is performed after hot working, the quenching temperature corresponds to the surface temperature of the intermediate steel material that is measured by a thermometer placed on the exit side of the apparatus that performs the final hot working. Further, in a case where quenching is performed after supplementary heating is performed after hot working, the quenching temperature corresponds to the temperature of the furnace that performs the supplementary heating.

The quenching method, for example, continuously cools the hollow shell from the quenching starting temperature, and continuously decreases the surface temperature of the hollow shell. The method of performing the continuous cooling treatment is not particularly limited. The method of performing the continuous cooling treatment is, for example, a method that cools the hollow shell by immersing the hollow shell in a water bath, or a method that cools the hollow shell in an accelerated manner by shower water cooling or mist cooling.

If the cooling rate during quenching is too slow, the microstructure does not become one that is principally composed of martensite and bainite, and the mechanical property defined in the present application is not obtained. Therefore, the cooling rate during quenching (average cooling rate when cooling from 800° C. to 500° C.) is made 300° C./min or more. A preferable lower limit of the cooling rate during quenching is 450° C./min, and more preferably is 600° C./min.

Preferably, quenching is performed after performing heating of the hollow shell in the austenite zone a plurality of times. In this case, the SSC resistance of the steel material increases because austenite grains are refined prior to quenching. Heating in the austenite zone may be repeated a plurality of times by performing quenching a plurality of times, or heating in the austenite zone may be repeated a plurality of times by performing normalizing and quenching. Hereunder, the tempering process will be described in detail.

[Tempering Process]

The tempering process is performed by subjecting the intermediate steel material to tempering after performing the aforementioned quenching. The tempering temperature is appropriately adjusted in accordance with the chemical composition of the steel material and the YS, which is to be obtained. In other words, with respect to the intermediate steel material (hollow shell) containing the chemical composition of the present embodiment, the tempering temperature is adjusted so as to adjust the YS of the steel material to within a range of 862 to less than 965 MPa (125 to less than 140 ksi).

A preferable tempering temperature is in a range from 670° C. to the $A_{c1}$ point. If the tempering temperature is 670° C. or more, carbides are sufficiently spheroidized and the SSC resistance is further increased.

If the holding time for tempering (tempering time) is too short, the amount of dissolved C becomes excessive because precipitation of carbides does not proceed. Even if the tempering time is overlong, an effect that dissolves C is saturated. Therefore, in order to control the amount of dissolved C to be within an appropriate range, the tempering time is within a range of 10 to 180 minutes. A preferable lower limit of the tempering time is 15 minutes. Note that, in a case where the steel material is a steel pipe, in comparison to other shapes, temperature variations with respect to the steel pipe are liable to occur during holding for tempering. Therefore, in a case where the steel material is a steel pipe, the tempering time is preferably set within a range of 15 to 180 minutes.

Conventionally, cooling after tempering has not been controlled. However, if the cooling rate is slow, almost all of the C that had dissolved will reprecipitate while the temperature is decreasing. In other words, the amount of dissolved C will be approximately 0 mass %. Therefore, in the present embodiment, cooling after tempering is accelerated. By this means, the amount of dissolved C of the present invention is obtained.

The cooling method is, for example, a method that performs forced cooling of the hollow shell continuously from the tempering temperature to thereby continuously decrease the surface temperature of the steel material. Examples of this kind of continuous cooling treatment include a method that cools the hollow shell by immersion in a water bath, and a method that cools the intermediate steel material in an accelerated manner by shower water cooling, mist cooling or forced air cooling.

The cooling rate after tempering is measured at a region that is most slowly cooled within a cross-section of the tempered intermediate steel material (for example, in a case of forcedly cooling both surfaces, the cooling rate is measured at the center portion of the thickness of the intermediate steel material). The temperature region from 600° C. to 200° C. is a temperature region in which diffusion of C is comparatively fast. Therefore, the average cooling rate in the temperature region from 600° C. to 200° C. is 5° C./sec or more. A preferable lower limit of the cooling rate after tempering is 10° C./sec, and more preferably is 15° C./sec.

On the other hand, if the cooling rate after tempering is too fast, very little of the C that had dissolved after being held during tempering precipitates. As a result, in some cases the amount of dissolved C is excessive. In such a case, the SSC resistance, conversely, decreases. Therefore, the cooling rate after tempering is not more than 100° C./sec. A preferable upper limit of the cooling temperature after tempering is 50° C./sec, and more preferably is 40° C./sec.

A method for producing a steel pipe has been described as one example of the aforementioned production method. However, the steel material of the present invention may be a steel plate or another shape. A method for producing a steel plate or a steel material of another shape also includes a preparation process, a quenching process and a tempering process, similarly to the production method described above.

EXAMPLES

Molten steels of a weight of 180 kg containing the chemical compositions shown in Table 4 were produced.

TABLE 4

| Test Number | Chemical Composition (Unit is mass %; balance is Fe and impurities) | | | | | | | | | | |
|---|---|---|---|---|---|---|---|---|---|---|---|
| | C | Si | Mn | P | S | Al | Cr | Mo | Ti | B | N |
| 1 | 0.26 | 0.31 | 0.42 | 0.007 | 0.0007 | 0.055 | 0.49 | 0.68 | 0.014 | 0.0013 | 0.003 |
| 2 | 0.27 | 0.29 | 0.46 | 0.007 | 0.0015 | 0.053 | 0.48 | 0.68 | 0.016 | 0.0011 | 0.004 |
| 3 | 0.28 | 0.31 | 0.46 | 0.008 | 0.0013 | 0.051 | 1.05 | 0.67 | 0.014 | 0.0013 | 0.003 |
| 4 | 0.27 | 0.30 | 0.43 | 0.009 | 0.0006 | 0.026 | 1.04 | 0.68 | 0.014 | 0.0013 | 0.003 |
| 5 | 0.26 | 0.31 | 0.44 | 0.007 | 0.0005 | 0.041 | 0.50 | 0.71 | 0.013 | 0.0014 | 0.003 |
| 6 | 0.26 | 0.29 | 0.45 | 0.010 | 0.0010 | 0.056 | 0.48 | 0.70 | 0.018 | 0.0013 | 0.004 |

TABLE 4-continued

| | | | | | | | | | | | |
|---|---|---|---|---|---|---|---|---|---|---|---|
| 7 | 0.27 | 0.23 | 0.41 | 0.006 | 0.0011 | 0.037 | 1.01 | 0.80 | 0.014 | 0.0013 | 0.005 |
| 8 | 0.26 | 0.27 | 0.43 | 0.007 | 0.0010 | 0.029 | 0.99 | 0.85 | 0.013 | 0.0013 | 0.003 |
| 9 | 0.28 | 0.26 | 0.42 | 0.010 | 0.0009 | 0.035 | 0.53 | 0.69 | 0.007 | 0.0012 | 0.003 |
| 10 | 0.27 | 0.26 | 0.44 | 0.012 | 0.0010 | 0.036 | 0.53 | 1.25 | 0.007 | 0.0012 | 0.004 |
| 11 | 0.27 | 0.26 | 0.44 | 0.012 | 0.0010 | 0.036 | 0.65 | 0.70 | 0.007 | 0.0012 | 0.003 |
| 12 | 0.26 | 0.26 | 0.44 | 0.010 | 0.0010 | 0.036 | 1.35 | 0.85 | 0.007 | 0.0012 | 0.004 |
| 13 | 0.30 | 0.24 | 0.41 | 0.001 | 0.0004 | 0.039 | 1.10 | 0.69 | 0.010 | 0.0005 | 0.002 |
| 14 | 0.26 | 0.26 | 0.43 | 0.011 | 0.0008 | 0.035 | 1.00 | 0.69 | 0.006 | 0.0011 | 0.004 |
| 15 | 0.26 | 0.29 | 0.40 | 0.010 | 0.0007 | 0.031 | 1.10 | 0.80 | 0.015 | 0.0005 | 0.003 |
| 16 | 0.29 | 0.26 | 0.40 | 0.006 | 0.0010 | 0.030 | 0.68 | 0.88 | 0.015 | 0.0015 | 0.008 |
| 17 | 0.29 | 0.31 | 0.47 | 0.005 | 0.0004 | 0.038 | 1.00 | 1.10 | 0.018 | 0.0026 | 0.005 |
| 18 | 0.28 | 0.29 | 0.40 | 0.009 | 0.0006 | 0.032 | 0.20 | 0.85 | 0.015 | 0.0001 | 0.003 |
| 19 | 0.29 | 0.28 | 0.44 | 0.011 | 0.0006 | 0.037 | 1.30 | 0.20 | 0.006 | 0.0013 | 0.005 |
| 20 | 0.27 | 0.28 | 1.30 | 0.011 | 0.0010 | 0.036 | 0.52 | 0.56 | 0.006 | 0.0013 | 0.004 |
| 21 | 0.28 | 0.28 | 0.44 | 0.011 | 0.0011 | 0.033 | 0.51 | 0.88 | 0.027 | 0.0014 | 0.015 |
| 22 | 0.28 | 0.75 | 0.44 | 0.011 | 0.0009 | 0.034 | 0.52 | 0.98 | 0.027 | 0.0014 | 0.005 |
| 23 | 0.28 | 0.28 | 0.44 | 0.010 | 0.0008 | 0.036 | 0.51 | 1.05 | 0.006 | 0.0013 | 0.005 |

| Test Number | Chemical Composition (Unit is mass %; balance is Fe and impurities) | | | | | | | | |
|---|---|---|---|---|---|---|---|---|---|
| | O | V | Nb | Ca | Mg | Zr | Co | W | Ni | Cu |
| 1 | 0.0007 | — | — | — | — | — | — | — | — | — |
| 2 | 0.0008 | 0.10 | — | — | — | — | — | — | — | — |
| 3 | 0.0008 | 0.10 | 0.012 | — | — | — | — | — | — | — |
| 4 | 0.0010 | 0.09 | 0.015 | 0.0008 | — | — | — | — | — | — |
| 5 | 0.0013 | 0.10 | 0.012 | 0.0016 | 0.0005 | — | — | — | — | — |
| 6 | 0.0016 | 0.10 | 0.011 | 0.0012 | — | 0.0008 | — | — | — | — |
| 7 | 0.0006 | 0.09 | 0.026 | — | — | — | 0.35 | — | — | — |
| 8 | 0.0007 | 0.09 | 0.026 | — | — | — | — | 0.38 | — | — |
| 9 | 0.0011 | 0.10 | 0.029 | — | — | — | — | — | 0.15 | 0.15 |
| 10 | 0.0010 | 0.10 | 0.018 | 0.0013 | — | — | 0.38 | — | — | — |
| 11 | 0.0013 | 0.10 | 0.030 | — | — | — | 0.33 | 0.25 | — | — |
| 12 | 0.0012 | 0.10 | 0.031 | 0.0008 | 0.0005 | — | — | — | 0.03 | 0.03 |
| 13 | 0.0012 | 0.10 | 0.017 | 0.0015 | — | — | — | — | — | — |
| 14 | 0.0010 | — | — | — | — | — | — | — | — | — |
| 15 | 0.0012 | 0.10 | 0.014 | 0.0016 | — | — | — | — | — | — |
| 16 | 0.0017 | 0.10 | 0.012 | 0.0022 | — | — | — | — | — | — |
| 17 | 0.0015 | 0.10 | 0.012 | 0.0021 | — | — | — | — | — | — |
| 18 | 0.0013 | 0.10 | 0.014 | — | — | — | — | — | — | — |
| 19 | 0.0010 | 0.05 | 0.026 | 0.0016 | — | — | — | — | — | — |
| 20 | 0.0014 | 0.09 | 0.026 | 0.0016 | — | — | — | — | — | — |
| 21 | 0.0015 | 0.09 | 0.026 | 0.0015 | — | — | — | — | — | — |
| 22 | 0.0018 | 0.09 | 0.026 | 0.0015 | — | — | — | — | — | — |
| 23 | 0.0012 | 0.09 | 0.026 | 0.0015 | — | — | — | — | — | — |

Ingots were produced using the aforementioned molten steels. The ingots were hot rolled to produce steel plates having a thickness of 20 mm.

After hot rolling, the steel plate of each test number was allowed to cool to bring the steel plate temperature to normal temperature (25° C.).

After being allowed to cool, the steel plates were reheated to bring the steel plate temperature to the quenching temperature (920° C., which is in the austenite single-phase zone), and were held for 20 minutes. After being held, the steel plates were immersed in a water bath and quenched. At this time, the average cooling rate from 800° C. to 500° C. was 900° C./min. With respect to Test Number 23, after holding at the quenching temperature, the steel plate was cooled by immersion in an oil bath. At this time, the average cooling rate from 800° C. to 500° C. was 180° C./min.

After quenching, the respective steel plates were subjected to tempering. In the tempering, the tempering temperature was adjusted so that the steel plates became 125 ksi grade as specified in the API standards (yield strength of 862 to less than 965 MPa). After performing a heat treatment at the respective tempering temperatures, the steel plates were cooled. For the cooling, controlled cooling by mist water cooling from both sides of the steel plate was performed. Note that, a type K thermocouple of a sheath type was inserted into a center portion of the plate thickness of the steel plate in advance, and the temperature was measured with respect to tempering and the cooling thereafter. The tempering temperature (° C.) and tempering time (min), as well as the average cooling rate from 600° C. to 200° C. thereafter, that is, the cooling rate (° C./sec) after tempering are shown in Table 5. Note that, the $A_{c1}$ point of the steel material in each of Test Number 1 to Test Number 23 was 750° C., and the tempering temperature was set so as to be lower than the $A_{c1}$ point.

TABLE 5

| Test Number | Tempering Temperature (° C.) | Tempering Time (min) | Cooling Rate After Tempering (° C./sec) | YS (MPa) | TS (MPa) | YR (%) | Dissolved C Amount (mass %) | $K_{1SSC}$ (MPa√m) | | | |
|---|---|---|---|---|---|---|---|---|---|---|---|
| | | | | | | | | 1 | 2 | 3 | Average Value |
| 1 | 690 | 15 | 25 | 869 | 928 | 93.6 | 0.037 | 30.8 | 32.8 | 34.2 | 32.6 |
| 2 | 690 | 15 | 10 | 875 | 938 | 93.3 | 0.029 | 35.2 | 32.5 | 32.8 | 33.5 |

TABLE 5-continued

| Test Number | Tempering Temperature (° C.) | Tempering Time (min) | Cooling Rate After Tempering (° C./sec) | YS (MPa) | TS (MPa) | YR (%) | Dissolved C Amount (mass %) | $K_{1SSC}$ (MPa√m) 1 | 2 | 3 | Average Value |
|---|---|---|---|---|---|---|---|---|---|---|---|
| 3 | 680 | 40 | 10 | 890 | 950 | 93.7 | 0.027 | 30.4 | 31.5 | 31.5 | 31.1 |
| 4 | 680 | 40 | 5 | 895 | 953 | 93.9 | 0.023 | 30.7 | 30.8 | 31.5 | 31.0 |
| 5 | 690 | 30 | 10 | 905 | 955 | 94.8 | 0.028 | 31.7 | 33.5 | 31.2 | 32.1 |
| 6 | 680 | 35 | 10 | 895 | 960 | 93.2 | 0.026 | 32.6 | 33.2 | 32.0 | 32.6 |
| 7 | 680 | 35 | 35 | 915 | 975 | 93.8 | 0.038 | 33.5 | 33.5 | 35.2 | 34.1 |
| 8 | 680 | 35 | 35 | 905 | 970 | 93.3 | 0.038 | 31.3 | 33.1 | 32.6 | 32.3 |
| 9 | 680 | 60 | 35 | 865 | 925 | 93.5 | 0.031 | 30.4 | 32.1 | 33.6 | 32.0 |
| 10 | 680 | 30 | 15 | 923 | 980 | 94.2 | 0.029 | 35.0 | 37.2 | 37.5 | 36.6 |
| 11 | 680 | 30 | 10 | 915 | 992 | 92.2 | 0.021 | 35.8 | 36.7 | 36.2 | 36.2 |
| 12 | 680 | 30 | 10 | 888 | 945 | 94.0 | 0.015 | 31.5 | 32.3 | 33.6 | 32.5 |
| 13 | 680 | 60 | 25 | 883 | 933 | 94.6 | 0.047 | 33.6 | 35.9 | 35.8 | 35.1 |
| 14 | 680 | 30 | 2 | 895 | 950 | 94.2 | 0.006 | 24.5 | 26.5 | 26.7 | 25.9 |
| 15 | 680 | 40 | 2 | 900 | 955 | 94.2 | 0.002 | 26.2 | 20.7 | 22.7 | 23.2 |
| 16 | 690 | 5 | 10 | 910 | 968 | 94.0 | 0.065 | 23.2 | 22.6 | 24.5 | 23.4 |
| 17 | 680 | 10 | 600 | 895 | 973 | 92.0 | 0.064 | 23.5 | 24.5 | 25.0 | 24.3 |
| 18 | 690 | 30 | 15 | 905 | 965 | 93.8 | 0.044 | 26.0 | 20.5 | 23.0 | 23.2 |
| 19 | 690 | 30 | 25 | 900 | 960 | 93.8 | 0.040 | 20.0 | 22.0 | 23.7 | 21.9 |
| 20 | 690 | 30 | 5 | 882 | 934 | 94.4 | 0.011 | 19.5 | 20.5 | 21.7 | 20.6 |
| 21 | 690 | 30 | 25 | 880 | 945 | 93.1 | 0.033 | 25.3 | 25.8 | 27.2 | 26.1 |
| 22 | 690 | 30 | 15 | 882 | 934 | 94.4 | 0.033 | 22.3 | 25.2 | 20.8 | 22.8 |
| 23 | 690 | 10 | 15 | 865 | 1005 | 86.1 | 0.022 | 26.5 | 20.3 | 21.5 | 22.8 |

[Evaluation Results]
[YS and TS Tests]

A tensile test was performed in accordance with ASTM E8. Round bar tensile test specimens having a diameter of 6.35 mm and a parallel portion length of 35 mm were prepared from the center part of the thickness of each steel plate after the quenching and tempering described above. The axial direction of each of the tensile test specimens was parallel to the rolling direction of the steel plate. A tensile test was performed in the atmosphere at normal temperature (25° C.) using each round bar test specimen, and the YS (MPa) and TS (MPa) at respective positions were obtained. Note that, in the present examples, the stress at the time of 0.65% elongation obtained in the tensile test defined as the YS for each test number. Further, the largest stress during uniform elongation was taken as the TS. A ratio between the YS and the TS was adopted as the YR (%).

[Microstructure Determination Test]

With respect to the microstructures of the present embodiments, apart from Test Number 23, because the YS was in a range of 862 to less than 965 MPa (125 to less than 140 ksi) and the YR was 90% or more, it was determined that the total of the volume ratios of tempered martensite and tempered bainite was 90% or more. In the case of Test Number 23, it is considered that ferrite formed.

[Amount of Dissolved C Measurement Test]

The amount of dissolved C (mass %) was measured and calculated by the measurement method described above. Note that, the TEM used was JEM-2010 manufactured by JEOL Ltd., the acceleration voltage was set to 200 kV, and for the EDS point analysis the irradiation current was 2.56 nA, and measurement was performed for 60 seconds at each point. The observation regions for the TEM observation were 8 μm×8 μm, and observation was performed with respect to an arbitrary 10 visual fields. The residual amounts of each element and the concentrations of each element in cementite that were used to calculate the amount of dissolved C were as listed in Table 6.

TABLE 6

| Test Number | Residual Amount (mass %) | | | | | | Concentration In Cementite (mass %) | | | | Dissolved C Amount (mass %) |
|---|---|---|---|---|---|---|---|---|---|---|---|
| | Fe | Cr | Mn | Mo | V | Nb | Fe | Cr | Mn | Mo | |
| 1 | 2.5 | 0.23 | 0.10 | 0.24 | — | — | 88.6 | 4.1 | 2.6 | 4.7 | 0.037 |
| 2 | 2.4 | 0.23 | 0.13 | 0.28 | 0.080 | — | 82.6 | 7.5 | 3.8 | 5.0 | 0.029 |
| 3 | 2.5 | 0.51 | 0.10 | 0.19 | 0.069 | 0.012 | 76.3 | 14.6 | 2.8 | 5.0 | 0.027 |
| 4 | 2.4 | 0.51 | 0.09 | 0.20 | 0.069 | 0.015 | 76.3 | 14.5 | 3.0 | 5.1 | 0.023 |
| 5 | 2.3 | 0.22 | 0.10 | 0.28 | 0.078 | 0.012 | 85.2 | 5.6 | 2.9 | 5.0 | 0.028 |
| 6 | 2.3 | 0.21 | 0.11 | 0.29 | 0.076 | 0.011 | 87.8 | 3.7 | 3.0 | 4.8 | 0.026 |
| 7 | 2.2 | 0.47 | 0.09 | 0.22 | 0.067 | 0.026 | 79.8 | 10.7 | 2.5 | 6.0 | 0.038 |
| 8 | 2.1 | 0.45 | 0.09 | 0.20 | 0.060 | 0.026 | 76.7 | 14.6 | 2.6 | 5.0 | 0.038 |
| 9 | 2.5 | 0.23 | 0.11 | 0.28 | 0.082 | 0.029 | 82.3 | 8.1 | 2.8 | 5.5 | 0.031 |
| 10 | 2.5 | 0.23 | 0.10 | 0.28 | 0.070 | 0.018 | 81.4 | 7.7 | 2.9 | 6.8 | 0.029 |
| 11 | 2.5 | 0.22 | 0.11 | 0.29 | 0.079 | 0.030 | 80.2 | 10.8 | 2.9 | 5.5 | 0.021 |
| 12 | 2.4 | 0.22 | 0.11 | 0.28 | 0.083 | 0.031 | 70.4 | 20.9 | 2.5 | 4.5 | 0.015 |
| 13 | 2.4 | 0.50 | 0.11 | 0.21 | 0.071 | 0.017 | 84.7 | 6.8 | 2.6 | 5.0 | 0.047 |
| 14 | 2.7 | 0.51 | 0.11 | 0.20 | — | — | 85.9 | 7.2 | 2.9 | 4.0 | 0.006 |
| 15 | 2.5 | 0.51 | 0.11 | 0.21 | 0.072 | 0.014 | 77.6 | 15.0 | 2.2 | 4.8 | 0.002 |
| 16 | 2.4 | 0.26 | 0.11 | 0.16 | 0.050 | 0.026 | 88.7 | 4.2 | 3.0 | 3.7 | 0.065 |
| 17 | 2.2 | 0.46 | 0.09 | 0.20 | 0.065 | 0.012 | 79.9 | 10.0 | 3.3 | 6.3 | 0.064 |
| 18 | 2.6 | 0.15 | 0.09 | 0.20 | 0.073 | 0.014 | 90.1 | 2.0 | 2.5 | 5.0 | 0.044 |

TABLE 6-continued

| Test Number | Residual Amount (mass %) | | | | | | Concentration In Cementite (mass %) | | | | Dissolved C Amount (mass %) |
|---|---|---|---|---|---|---|---|---|---|---|---|
| | Fe | Cr | Mn | Mo | V | Nb | Fe | Cr | Mn | Mo | |
| 19 | 2.6 | 0.50 | 0.10 | 0.10 | 0.030 | 0.026 | 77.5 | 17.0 | 3.2 | 1.8 | 0.040 |
| 20 | 2.3 | 0.60 | 0.20 | 0.29 | 0.070 | 0.026 | 80.5 | 6.8 | 5.0 | 6.9 | 0.011 |
| 21 | 2.4 | 0.51 | 0.10 | 0.20 | 0.068 | 0.026 | 83.2 | 7.0 | 3.0 | 6.0 | 0.033 |
| 22 | 2.3 | 0.51 | 0.10 | 0.20 | 0.080 | 0.026 | 85.3 | 8.0 | 1.5 | 4.5 | 0.033 |
| 23 | 2.5 | 0.52 | 0.11 | 0.21 | 0.070 | 0.026 | 83.3 | 7.3 | 3.0 | 5.6 | 0.022 |

[DCB Test]

Figure 3A:
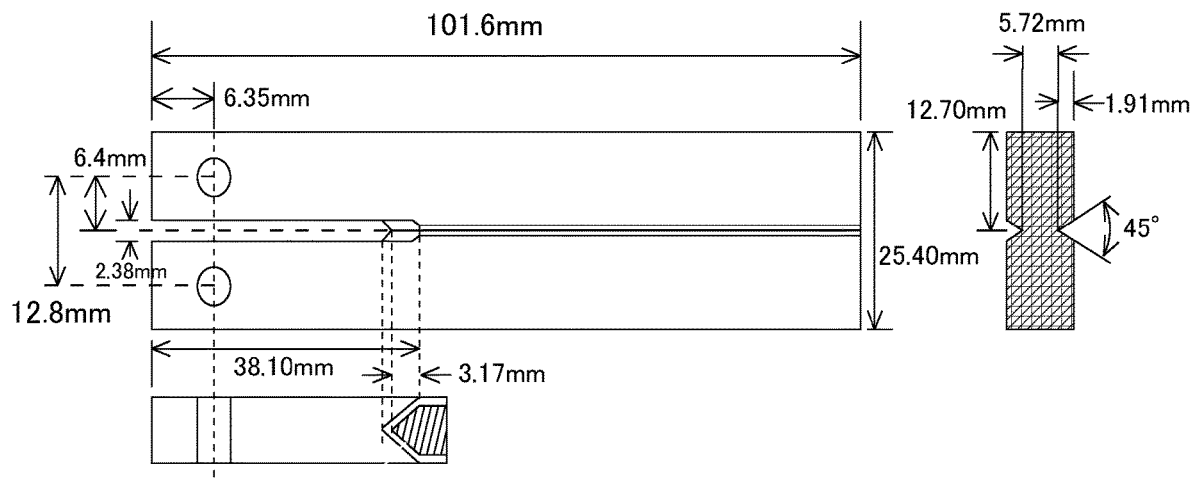
FIG. 3A shows a side view and a cross-sectional view of a DCB test specimen that is used in a DCB test in the examples.
Figure 3B:
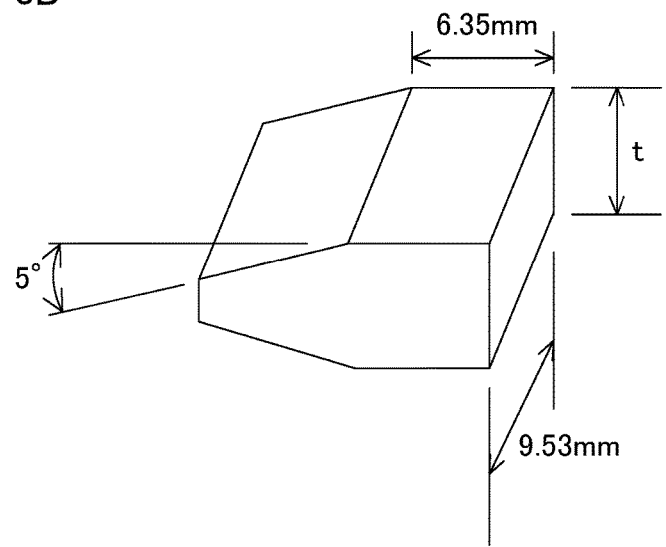
FIG. 3B is a perspective view of a wedge that is used in the DCB test in the examples.

Using each steel plate, a DCB test was conducted in accordance with "Method D" of NACE TM0177-2005, and the SSC resistance was evaluated. Specifically, three of the DCB test specimen illustrated in FIG. 3A were taken from a center portion of the wall thickness of each steel plate. FIG. 3A shows a side view and a cross-sectional view of the DCB test specimen. The DCB test specimens were taken in a manner such that the longitudinal direction of each DCB test specimen was parallel with the rolling direction. A wedge illustrated in FIG. 3B was further prepared from each steel plate. FIG. 3B is a perspective view of the wedge. A thickness t of the wedge was 3.10 mm.

The wedge was driven in between the arms of the DCB test specimen. Thereafter, the DCB test specimen into which the wedge was driven was enclosed in a container. A liquid solution obtained by mixing a degassed 5% saline solution and 4 g/L of sodium acetate and adjusting to pH 3.5 with hydrochloric acid was poured into the container so that a gas portion remained in the container. Thereafter, a gaseous mixture consisting of 10% $H_2S$ gas and 90% $CO_2$ gas was charged at a total pressure of 1 atm inside the autoclave to stir the liquid phase, and the gaseous mixture was saturated in the liquid solution.

After sealing the container that had undergone the above described process, the container was held for three weeks at 24° C. while stirring the liquid solution and also continuously blowing in the aforementioned gaseous mixture. Thereafter, the DCB test specimens were taken out from inside the container.

A pin was inserted into a hole formed in the tip of the arms of each DCB test specimen that was taken out and a notch portion was opened with a tensile testing machine, and a wedge releasing stress P was measured. In addition, the notch in the DCB test specimen was released in liquid nitrogen, and a crack propagation length "a" with respect to crack propagation that occurred during immersion was measured. The crack propagation length "a" was measured visually using vernier calipers. A fracture toughness value $K_{1SSC}$ (MPa√m) was determined using Formula (6) based on the obtained wedge releasing stress P and the crack propagation length "a".

$$K_{1SSC} = \frac{Pa(2\sqrt{3} + 2.38^{h/a})\left(\frac{B}{Bn}\right)^{1/\sqrt{3}}}{Bh^{3/2}} \quad (6)$$

In Formula (6), h represents the height (mm) of each arm of the DCB test specimen, B represents the thickness (mm) of the DCB test specimen, and Bn represents the web thickness (mm) of the DCB test specimen. These are defined in "Method D" of NACE TM0177-96.

For each test number, the fracture toughness value $K_{1SSC}$ (MPa√m) of the three DCB test specimens was determined. For each test number, the arithmetic average of the fracture toughness values of the three DCB test specimens was defined as the fracture toughness value $K_{1SSC}$ (MPa√m) of the relevant test number. The obtained fracture toughness values $K_{1SSC}$ are shown in Table 5. If the fracture toughness value $K_{1SSC}$ that was defined as described above was 30.0 MPa√m or more, it was determined that the SSC resistance was good. Note that, the clearance between the arms when the wedge is driven in prior to immersion in the test bath influences the $K_{1SSC}$ value. Accordingly, actual measurement of the clearance between the arms was performed in advance using a micrometer, and it was also confirmed that the clearance was within the range in the API standards.

[Test Results]

The test results are shown in Table 5.

Referring to Table 4 and Table 5, the chemical compositions of the steel plates of Test Numbers 1 to 13 were appropriate, the YS was in the range of 862 to less than 965 MPa (125 to less than 140 ksi), and the YR was 90% or more. In addition, the amount of dissolved C was in the range of 0.010 to 0.050 mass %. As a result, $K_{1SSC}$ was 30.0 MPa√m or more and excellent SSC resistance was exhibited.

On the other hand, for the steel plates of Test Numbers 14 and 15, although the chemical compositions were appropriate, the YS was in the range of 862 to less than 965 MPa (125 to less than 140 ksi) and the YR was 90% or more, the cooling rate after tempering was too slow. Consequently, the amount of dissolved C was less than 0.010 mass %. As a result, the fracture toughness value $K_{1SSC}$ was less than 30.0 MPa√m and excellent SSC resistance was not exhibited.

For the steel plate of Test Number 16, although the chemical composition was appropriate, the YS was in the range of 862 to less than 965 MPa (125 to less than 140 ksi) and the YR was 90% or more, the tempering time was too short. Consequently, the amount of dissolved C was more than 0.050 mass %. As a result, the fracture toughness value $K_{1SSC}$ was less than 30.0 MPa√m and excellent SSC resistance was not exhibited.

For the steel plate of Test Number 17, although the chemical composition was appropriate, the YS was in the range of 862 to less than 965 MPa (125 to less than 140 ksi) and the YR was 90% or more, the cooling rate after tempering was too fast. Consequently, the amount of dissolved C was more than 0.050 mass %. As a result, the fracture toughness value $K_{1SSC}$ was less than 30.0 MPa√m and excellent SSC resistance was not exhibited.

For the steel plate of Test Number 18, although the amount of dissolved C was in the range of 0.010 to 0.050 mass %, the YS was in the range of 862 to less than 965 MPa (125 to less than 140 ksi) and the YR was 90% or more, the Cr content was too low. As a result, the fracture toughness value $K_{1SSC}$ was less than 30.0 MPa√m and excellent SSC resistance was not exhibited.

For the steel plate of Test Number 19, although the amount of dissolved C was in the range of 0.010 to 0.050 mass %, the YS was in the range of 862 to less than 965 MPa (125 to less than 140 ksi) and the YR was 90% or more, the Mo content was too low. As a result, the fracture toughness value $K_{1SSC}$ was less than 30.0 MPa√m and excellent SSC resistance was not exhibited.

For the steel plate of Test Number 20, although the amount of dissolved C was in the range of 0.010 to 0.050 mass %, the YS was in the range of 862 to less than 965 MPa (125 to less than 140 ksi) and the YR was 90% or more, the Mn content was too high. As a result, the fracture toughness value $K_{1SSC}$ was less than 30.0 MPa√m and excellent SSC resistance was not exhibited.

For the steel plate of Test Number 21, although the amount of dissolved C was in the range of 0.010 to 0.050 mass %, the YS was in the range of 862 to less than 965 MPa (125 to less than 140 ksi) and the YR was 90% or more, the N content was too high. As a result, the fracture toughness value $K_{1SSC}$ was less than 30.0 MPa√m and excellent SSC resistance was not exhibited.

For the steel plate of Test Number 22, although the amount of dissolved C was in the range of 0.010 to 0.050 mass %, the YS was in the range of 862 to less than 965 MPa (125 to less than 140 ksi) and the YR was 90% or more, the Si content was too high. As a result, the fracture toughness value $K_{1SSC}$ was less than 30.0 MPa√m and excellent SSC resistance was not exhibited.

For the steel plate of Test Number 23, although the chemical composition was appropriate, the amount of dissolved C was in the range of 0.010 to 0.050 mass % and the YS was in the range of 862 to less than 965 MPa (125 to less than 140 ksi), the YR was less than 90%. As a result, the fracture toughness value $K_{1SSC}$ was less than 30.0 MPa√m and excellent SSC resistance was not exhibited. It is considered that the reason was that ferrite mixed into the microstructure because the cooling rate after quenching was slow.

An embodiment of the present invention has been described above. However, the embodiment described above is merely an example for implementing the present invention. Accordingly, the present invention is not limited to the above embodiment, and the above embodiment can be appropriately modified and performed within a range that does not deviate from the gist of the present invention.

INDUSTRIAL APPLICABILITY

The steel material according to the present invention is widely applicable to steel materials to be utilized in a sour environment, and preferably can be utilized as a steel material for oil wells that is utilized in an oil well environment, and further preferably can be utilized as oil-well steel pipes, such as casing, tubing and line pipes.

The invention claimed is:

1. A steel material having:
a chemical composition consisting of, in mass %,
C: 0.26 to 0.50%,
Si: 0.05 to 0.50%,
Mn: 0.05 to 1.00%,
P: 0.025% or less,
S: 0.0100% or less,
Al: 0.005 to 0.100%,
Cr: 0.30 to 1.50%,
Mo: 0.25 to 1.50%,
Ti: 0.002 to 0.050%,
B: 0.0001 to 0.0050%,
N: 0.002 to 0.010%,
O: 0.0100% or less,
V: 0 to 0.30%,
Nb: 0 to 0.100%,
Ca: 0 to 0.0100%,
Mg: 0 to 0.0100%,
Zr: 0 to 0.0100%,
Co: 0 to 0.50%,
W: 0 to 0.50%,
Ni: 0 to 0.50%, and
Cu: 0 to 0.50%,
with the balance being Fe and impurities,
an amount of dissolved C within a range of 0.010 to 0.050 mass %,
a yield strength within a range of 862 to less than 965 MPa, and
a yield ratio of 90% or more.

2. The steel material according to claim 1, wherein the chemical composition contains one or more types of element selected from the group consisting of:
V: 0.01 to 0.30%, and
Nb: 0.002 to 0.100%.

3. The steel material according to claim 2, wherein the chemical composition contains one or more types of element selected from the group consisting of:
Ca: 0.0001 to 0.0100%,
Mg: 0.0001 to 0.0100%, and
Zr: 0.0001 to 0.0100%.

4. The steel material according to claim 3, wherein the chemical composition contains one or more types of element selected from the group consisting of:
Co: 0.02 to 0.50%, and
W: 0.02 to 0.50%.

5. The steel material according claim 4, wherein the chemical composition contains one or more types of element selected from the group consisting of:
Ni: 0.02 to 0.50%, and
Cu: 0.01 to 0.50%.

6. The steel material according claim 3, wherein the chemical composition contains one or more types of element selected from the group consisting of:
Ni: 0.02 to 0.50%, and
Cu: 0.01 to 0.50%.

7. The steel material according to claim 2, wherein the chemical composition contains one or more types of element selected from the group consisting of:
Co: 0.02 to 0.50%, and
W: 0.02 to 0.50%.

8. The steel material according claim 7, wherein the chemical composition contains one or more types of element selected from the group consisting of:
Ni: 0.02 to 0.50%, and
Cu: 0.01 to 0.50%.

9. The steel material according claim 2, wherein the chemical composition contains one or more types of element selected from the group consisting of:
Ni: 0.02 to 0.50%, and
Cu: 0.01 to 0.50%.

10. The steel material according to claim 1, wherein the chemical composition contains one or more types of element selected from the group consisting of:
Ca: 0.0001 to 0.0100%,
Mg: 0.0001 to 0.0100%, and
Zr: 0.0001 to 0.0100%.

11. The steel material according to claim 10, wherein the chemical composition contains one or more types of element selected from the group consisting of:
Co: 0.02 to 0.50%, and
W: 0.02 to 0.50%.

12. The steel material according claim 11, wherein the chemical composition contains one or more types of element selected from the group consisting of:
Ni: 0.02 to 0.50%, and
Cu: 0.01 to 0.50%.

13. The steel material according to claim 10, wherein the chemical composition contains one or more types of element selected from the group consisting of:
Ni: 0.02 to 0.50%, and
Cu: 0.01 to 0.50%.

14. The steel material according to claim 1, wherein the chemical composition contains one or more types of element selected from the group consisting of:
Co: 0.02 to 0.50%, and
W: 0.02 to 0.50%.

15. The steel material according claim 14, wherein the chemical composition contains one or more types of element selected from the group consisting of:
Ni: 0.02 to 0.50%, and
Cu: 0.01 to 0.50%.

16. The steel material according to claim 1, wherein the chemical composition contains one or more types of element selected from the group consisting of:
Ni: 0.02 to 0.50%, and
Cu: 0.01 to 0.50%.

17. The steel material according to claim 1, wherein the steel material is in an oil-well steel pipe.

18. A method for producing the steel material according to claim 1, comprising:
a preparation process of preparing an intermediate steel material containing a chemical composition consisting of, in mass % C: 0.26 to 0.50%, Si: 0.05 to 0.50%, Mn: 0.05 to 1.00%, P: 0.025% or less, S: 0.0100% or less, Al: 0.005 to 0.100%, Cr: 0.30 to 1.50%, Mo: 0.25 to 1.50%, Ti: 0.002 to 0.050%, B: 0.0001 to 0.0050%, N: 0.002 to 0.010%, O: 0.0100% or less, V: 0 to 0.30%, Nb: 0 to 0.100%, Ca: 0 to 0.0100%, Mg: 0 to 0.0100%, Zr: 0 to 0.0100%, Co: 0 to 0.50%, W: 0 to 0.50%, Ni: 0 to 0.50%, and Cu: 0 to 0.50%, with the balance being Fe and impurities,
a quenching process of, after the preparation process, cooling the intermediate steel material that is at a temperature in a range of 800 to 1000° C. at a cooling rate of 300° C./min or more; and
a tempering process of holding the intermediate steel material after quenching at a temperature in a range of 670° C. to an $A_{c1}$ point for 10 to 180 minutes, and thereafter cooling the intermediate steel material at an average cooling rate in a temperature region from 600° C. to 200° C. of 5 to 100° C./sec.

19. The method for producing the steel material according to claim 18, wherein the preparation process includes:
a starting material preparation process of preparing a starting material containing a chemical composition consisting of, in mass %, C: 0.25 to 0.50%, Si: 0.05 to 0.50%, Mn: 0.05 to 1.00%, P: 0.025% or less, S: 0.0100% or less, Al: 0.005 to 0.100%, Cr: 0.30 to 1.50%, Mo: 0.25 to 1.50%, Ti: 0.002 to 0.050%, B: 0.0001 to 0.0050%, N: 0.002 to 0.010%, O: 0.0100% or less, V: 0 to 0.30%, Nb: 0 to 0.100%, Ca: 0 to 0.0100%, Mg: 0 to 0.0100%, Zr: 0 to 0.0100%, Co: 0 to 0.50%, W: 0 to 0.50%, Ni: 0 to 0.50%, and Cu: 0 to 0.50%, with the balance being Fe and impurities, and
a hot working process of subjecting the starting material to hot working to produce an intermediate steel material.

* * * * *

UNITED STATES PATENT AND TRADEMARK OFFICE
CERTIFICATE OF CORRECTION

PATENT NO. : 11,078,558 B2
APPLICATION NO. : 16/339577
DATED : August 3, 2021
INVENTOR(S) : Yuji Arai et al.

Page 1 of 1

It is certified that error appears in the above-identified patent and that said Letters Patent is hereby corrected as shown below:

In the Claims

In Column 30, Claim 19, Line 5:
Please delete:
"consisting of, in mass%, C: 0.25 to 0.50%, Si: 0.05 to 0.50%, Mn: 0.05 to"

And insert:
-- consisting of, in mass%, C: 0.26 to 0.50%, Si: 0.05 to 0.50%, Mn: 0.05 to --

Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*